(12) United States Patent
Steele, Jr.

(10) Patent No.: US 7,395,297 B2
(45) Date of Patent: Jul. 1, 2008

(54) FLOATING POINT SYSTEM THAT REPRESENTS STATUS FLAG INFORMATION WITHIN A FLOATING POINT OPERAND

(75) Inventor: Guy L. Steele, Jr., Lexington, MA (US)

(73) Assignee: Sun Microsystems, Inc., Menlo Park, CA (US)

( * ) Notice: Subject to any disclaimer, the term of this patent is extended or adjusted under 35 U.S.C. 154(b) by 1238 days.

(21) Appl. No.: 10/035,747

(22) Filed: Dec. 28, 2001

(65) Prior Publication Data

US 2003/0005013 A1 Jan. 2, 2003

Related U.S. Application Data

(60) Provisional application No. 60/293,173, filed on May 25, 2001.

(51) Int. Cl.
*G06F 7/00* (2006.01)
(52) U.S. Cl. ..................................................... 708/525
(58) Field of Classification Search ................. 708/505, 708/525
See application file for complete search history.

(56) References Cited

U.S. PATENT DOCUMENTS

| | | |
|---|---|---|
| 3,725,649 A | 4/1973 | Deerfield |
| 4,777,613 A | 10/1988 | Shahan et al. |
| 4,788,655 A | 11/1988 | Nakayama et al. |
| 4,991,131 A | 2/1991 | Yeh et al. |
| 5,065,352 A | 11/1991 | Nakano |
| 5,126,963 A | 6/1992 | Fukasawa |
| 5,161,117 A | 11/1992 | Waggener, Jr. |
| 5,249,149 A | 9/1993 | Cocanougher et al. |
| 5,307,303 A | 4/1994 | Briggs et al. |
| 5,347,481 A | 9/1994 | Williams ..................... 364/748 |
| 5,347,482 A | 9/1994 | Williams ..................... 364/757 |
| 5,357,237 A | 10/1994 | Bearden et al. |

(Continued)

OTHER PUBLICATIONS

Title: "Safe Treatment of Overflow and Underflow Conditions", by Robert A. Fraley & J. Stephen Walther, Hewlett-Packard Co., pp. 1-5.

(Continued)

*Primary Examiner*—Tan V. Mai
(74) *Attorney, Agent, or Firm*—Finnegan Henderson Farabow Garrett & Dunner, LLP

(57) ABSTRACT

A floating point unit generates results in which status information generated for an operation is encoded within the resulting operand, instead of requiring a separate floating point status register for the status information. In one embodiment, a floating point operand data structure includes a first portion having floating point operand data and a second portion having embedded status information associated with at least one status condition of the operand data. The status condition may be determined from only the embedded status information. The status condition may also be associated with at least one floating point operation that generated the operand data structure. The outcome of a conditional floating point instruction may be based on the embedded status information without regard to contents of the floating point status register. The second portion of the data structure may also have at least one bit indicative of the status condition, such as an invalid operation status, an overflow status, an underflow status, a division by zero status, an infinity status, and an inexact status.

54 Claims, 11 Drawing Sheets

U.S. PATENT DOCUMENTS

| | | | |
|---|---|---|---|
| 5,363,321 A | 11/1994 | Dao Trong et al. | |
| 5,365,465 A | 11/1994 | Larson | |
| 5,481,489 A | 1/1996 | Yanagida et al. | |
| 5,570,310 A | 10/1996 | Smith | |
| 5,666,301 A | 9/1997 | Makino | |
| 5,748,516 A | 5/1998 | Goddard et al. | |
| 5,812,439 A | 9/1998 | Hansen | |
| 5,862,066 A | 1/1999 | Rossin et al. | |
| 5,892,697 A | 4/1999 | Brakefield | |
| 5,931,943 A | 8/1999 | Orup | |
| 5,953,241 A | 9/1999 | Hansen et al. | |
| 5,963,461 A | 10/1999 | Gorshtein et al. | |
| 5,978,901 A * | 11/1999 | Luedtke et al. | 712/222 |
| 5,995,991 A | 11/1999 | Huang et al. | |
| 6,009,511 A | 12/1999 | Lynch et al. | 712/222 |
| 6,049,865 A | 4/2000 | Smith | |
| 6,081,823 A | 6/2000 | Purcell et al. | |
| 6,105,047 A | 8/2000 | Sharangpani et al. | |
| 6,108,772 A | 8/2000 | Sharangpani | |
| 6,131,106 A | 10/2000 | Steele, Jr. | 708/510 |
| 6,138,135 A | 10/2000 | Karp | |
| 6,151,669 A | 11/2000 | Huck et al. | |
| 6,189,094 B1 | 2/2001 | Hinds et al. | |
| 6,205,460 B1 | 3/2001 | Steele, Jr. | |
| 6,219,685 B1 | 4/2001 | Story | |
| 6,256,655 B1 | 7/2001 | Ezer et al. | |
| 6,286,023 B1 | 9/2001 | Purcell et al. | |
| 6,286,024 B1 | 9/2001 | Yano et al. | |
| 6,360,189 B1 | 3/2002 | Hinds et al. | |
| 6,393,555 B1 * | 5/2002 | Meier et al. | 712/222 |
| 6,490,607 B1 | 12/2002 | Oberman | |
| 6,571,265 B1 | 5/2003 | Story | |
| 6,594,681 B1 | 7/2003 | Prabhu | |
| 6,629,120 B1 | 9/2003 | Walster et al. | |
| 6,658,443 B1 | 12/2003 | Walster | |
| 6,658,444 B1 | 12/2003 | Walster et al. | |
| 6,697,832 B1 | 2/2004 | Kelley et al. | |
| 6,732,134 B1 | 5/2004 | Rosenberg et al. | |
| 6,789,098 B1 * | 9/2004 | Dijkstra | 708/495 |
| 2002/0194232 A1 | 12/2002 | Walster | |
| 2003/0033335 A1 | 2/2003 | Walster | |

OTHER PUBLICATIONS

Title: "Vax Floating Point: A Solid Foundation for Numerical Computation", by Mary Payne & Dileep Bhandarkar, Digital Equipment Corp., pp. 1-12.
Title: Lecture Notes on the Status of "IEEE Standard 754 for Binary Floating-Point Arithmetic", by Prof. W, Kahan, May 31, 1996, pp. 1-30.
Title: "Interval Arithmetic Specification" by Dmitri Chiriaev & G. William Walster, Draft revised May 4, 1998, pp. 1-78.
Title: "IEEE Standard for Binary Floating-Point Arithmetic" IEEE Standard 754-1985, by Standards Committee of the IEEE Computer Society, The Institute of Electrical and Electronics Engineers, Inc., copyright 1985, pp. 1-14.
U.S. Appl. No. 10/320,547, filed Dec. 17, 2002, Steele, Jr.
U.S. Appl. No. 10/320,450, filed Dec. 17, 2002, Steele, Jr.
U.S. Appl. No. 10/028,375, filed Dec. 28, 2001, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/0035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/036,133, filed Dec. 28, 2001, Steele, Jr.

* cited by examiner

| + | -∞ | -OV | -P | -UN | -0 | 0 | +UN | +P | +OV | +∞ | NaN |
|---|---|---|---|---|---|---|---|---|---|---|---|
| NaN | (e) | (j) | (q) | (u) | (q) | (q) | (u) | (q) | (j) | (e) | (z) |
| +∞ | (d) | (i) | (p) | (p) | (p) | (p) | (p) | (p) | (i) | (y) | (e) |
| +OV | (b) | (h) | (o) | (t) | +OV | +OV | +OV | +OV | +OV | (i) | (j) |
| +Q | (c) | (g) | (n) | (l) | +Q | +Q | (m) | (x) | +OV | (p) | (q) |
| +UN | (c) | (f) | (m) | (s) | +UN | +UN | (w) | (m) | +OV | (p) | (u) |
| 0 | (c) | -OV | -P | -UN | (v) | +0 | +UN | +P | +OV | (p) | (q) |
| -0 | (c) | -OV | -P | -UN | -0 | (v) | +UN | +P | +OV | (p) | (q) |
| -UN | (c) | -OV | (l) | (r) | -UN | -UN | (s) | (l) | (t) | (p) | (u) |
| -Q | (c) | -OV | (k) | (l) | -Q | -Q | (m) | (n) | (o) | (p) | (q) |
| -OV | (b) | -OV | -OV | -OV | -OV | -OV | (f) | (g) | (h) | (i) | (j) |
| -∞ | (a) | (b) | (c) | (c) | (c) | (c) | (c) | (c) | (b) | (d) | (e) |

FIG. 5

| * | -∞ | -OV | -Q | -1 | -S | -UN | -0 | +0 | +UN | +S | +1 | +Q | +OV | +∞ | NaN |
|---|---|---|---|---|---|---|---|---|---|---|---|---|---|---|---|
| -∞ | (a) | (b) | (c) | (c) | (c) | (d) | (e) | (f) | (g) | (h) | (h) | (h) | (i) | (j) | (k) |
| -OV | (b) | +OV | +OV | +OV | (l) | (m) | +0 | -0 | (n) | (o) | -OV | -OV | -OV | (i) | (p) |
| -P | (c) | +OV | (q) | (q) | (q) | (r) | +0 | -0 | (s) | (t) | (t) | (t) | -OV | (h) | (u) |
| -1 | (c) | +OV | (q) | (q) | (q) | +UN | +0 | -0 | -UN | (t) | (t) | (t) | -OV | (h) | (u) |
| -R | (c) | (l) | (q) | (q) | (q) | +UN | +0 | -0 | -UN | (t) | (t) | (t) | (v) | (h) | (u) |
| -UN | (d) | (m) | (r) | +UN | +UN | +UN | +0 | -0 | -UN | -UN | -UN | (w) | (n) | (g) | (x) |
| -0 | (e) | +0 | +0 | +0 | +0 | +0 | +0 | -0 | -0 | -0 | -0 | -0 | -0 | (f) | (u) |
| +0 | (f) | -0 | -0 | -0 | -0 | -0 | -0 | +0 | +0 | +0 | +0 | +0 | +0 | (e) | (u) |
| +UN | (g) | (n) | (s) | -UN | -UN | -UN | -0 | +0 | +UN | +UN | +UN | (y) | (m) | (d) | (x) |
| +R | (h) | (o) | (t) | (t) | (t) | -UN | -0 | +0 | +UN | (q) | (q) | (q) | (z) | (c) | (u) |
| +1 | (h) | -OV | (t) | (t) | (t) | -UN | -0 | +0 | +UN | (q) | (q) | (q) | +OV | (c) | (u) |
| +P | (h) | -OV | (t) | (t) | (t) | (w) | -0 | +0 | (y) | (q) | (q) | (q) | +OV | (c) | (u) |
| +OV | (i) | -OV | -OV | -OV | (v) | (n) | -0 | +0 | (m) | (z) | +OV | +OV | +OV | (b) | (p) |
| +∞ | (j) | (i) | (h) | (h) | (h) | (g) | (f) | (e) | (d) | (c) | (c) | (c) | (b) | (a) | (k) |
| NaN | (k) | (p) | (u) | (u) | (u) | (x) | (u) | (u) | (x) | (u) | (u) | (u) | (p) | (k) | (@) |

*FIG. 6*

| / | -∞ | -OV | -Q | -1 | -S | -UN | -0 | +0 | +UN | +S | +1 | +Q | +OV | +∞ | NaN |
|---|---|---|---|---|---|---|---|---|---|---|---|---|---|---|---|
| -∞ | (a) | (b) | (c) | (c) | (c) | (d) | (c) | (e) | (f) | (e) | (e) | (e) | (g) | (h) | (i) |
| -OV | +0 | (j) | (k) | +OV | +OV | +OV | (l) | (m) | -OV | -OV | -OV | (n) | (o) | -0 | (p) |
| -P | +0 | (q) | (r) | (r) | (r) | +OV | (s) | (t) | -OV | (u) | (u) | (u) | (v) | -0 | (w) |
| -1 | +0 | (q) | (r) | (r) | (r) | +OV | (s) | (t) | -OV | (u) | (u) | (u) | (v) | -0 | (w) |
| -R | +0 | (q) | (r) | (r) | (r) | (x) | (s) | (t) | (y) | (u) | (u) | (u) | (v) | -0 | (w) |
| -UN | +0 | +UN | +UN | +UN | (z) | (1) | (2) | (3) | (4) | (5) | -UN | -UN | -UN | -0 | (6) |
| -0 | +0 | +0 | +0 | +0 | +0 | +0 | (7) | (8) | -0 | -0 | -0 | -0 | -0 | -0 | (w) |
| +0 | -0 | -0 | -0 | -0 | -0 | -0 | (8) | (7) | +0 | +0 | +0 | +0 | +0 | +0 | (w) |
| +UN | -0 | -UN | -UN | -UN | (9) | (4) | (3) | (2) | (1) | (5) | +UN | +UN | +UN | +0 | (6) |
| +R | -0 | (#) | (u) | (u) | (u) | $ | (s) | (%) | (@) | (r) | (r) | (r) | (') | +0 | (w) |
| +1 | -0 | (#) | (u) | (u) | (u) | -OV | (s) | +OV | +OV | (r) | (r) | (r) | (') | +0 | (w) |
| +P | -0 | (#) | (u) | (u) | (u) | -OV | (s) | +OV | +OV | (r) | (r) | (r) | (') | +0 | (w) |
| +OV | (g) | (o) | (8) | -OV | -OV | -OV | (m) | (l) | +OV | +OV | +OV | +OV | (j) | (a) | (p) |
| +∞ | (h) | (g) | (e) | (e) | (e) | (f) | (e) | (c) | (d) | (c) | (c) | (c) | (b) | (i) | (i) |
| NaN | (i) | (p) | (w) | (w) | (w) | (6) | (w) | (w) | (6) | (w) | (w) | (w) | (p) | (i) | (~) |

*FIG. 7*

| rem | −∞ | −OV | −Q | −UN | −0 | +0 | +UN | +Q | +OV | +∞ | NaN |
|---|---|---|---|---|---|---|---|---|---|---|---|
| −∞ | (a) | (b) | (c) | (d) | (e) | (e) | (d) | (c) | (b) | (a) | (f) |
| −OV | (g) | (h) | (i) | (j) | (k) | (k) | (j) | (i) | (h) | (g) | (l) |
| −P | −P | (m) | (n) | (o) | (p) | (p) | (o) | (n) | (m) | −P | (q) |
| −UN | −UN | (r) | −UN | (o) | (s) | (s) | (o) | −UN | (r) | −UN | (t) |
| −0 | −0 | (m) | −0 | (o) | (p) | (p) | (o) | −0 | (m) | −0 | (q) |
| +0 | +0 | (m) | +0 | (o) | (p) | (p) | (o) | +0 | (m) | +0 | (q) |
| +UN | +UN | (r) | +UN | (o) | (s) | (s) | (o) | +UN | (r) | +UN | (t) |
| +P | +P | (m) | (n) | (o) | (p) | (p) | (o) | (n) | (m) | +P | (q) |
| +∞ | (g) | (h) | (i) | (j) | (k) | (k) | (j) | (i) | (h) | (g) | (l) |
| NaN | (a) | (b) | (c) | (d) | (e) | (e) | (d) | (c) | (b) | (a) | (f) |
| NaN | (u) | (v) | (w) | (x) | (w) | (w) | (x) | (w) | (v) | (u) | (y) |

*FIG. 8*

| SQRT | |
|---|---|
| $-\infty$ | THE RESULT IS THE POSITIVE NaN VALUE 0 11111111 10000000000000011001 OUZX (TO INDICATE "SQUARE ROOT OF LESS THAN ZERO" WITH THE INVALID OPERATION FLAG SET), WHERE OUZX IS THE FOUR LEAST SIGNIFICANT BITS $f_{lsb+3}...f_{lsb}$ OF THE FRACTION FIELD OF THE OPERAND |
| -OV | THE RESULT IS THE POSITIVE NaN VALUE 0 11111111 10000000000000011011001 (TO INDICATE "SQUARE ROOT OF LESS THAN ZERO" WITH THE INVALID OPERATION, OVERFLOW, AND INEXACT FLAGS SET). |
| -P | THE RESULT IS THE POSITIVE NaN VALUE 0 11111111 10000000000000110010000 (TO INDICATE "SQUARE ROOT OF LESS THAN ZERO" WITH THE INVALID OPERATION FLAG SET). |
| -UN | THE RESULT IS THE POSITIVE NaN VALUE 0 11111111 10000000000000110010101 (TO INDICATE "SQUARE ROOT OF LESS THAN ZERO" WITH THE INVALID OPERATION, UNDERFLOW, AND INEXACT FLAGS SET). |
| -0 | THE RESULT IS -0. |
| +0 | THE RESULT IS +0. |
| +UN | FOR "ROUND TOWARD PLUS INFINITY", THE RESULT IS THE SAME AS IF +UN WERE REPLACED BY +TINY; FOR ALL OTHER ROUNDING MODES, THE RESULT IS +UN. |
| +P | THE RESULT IS AS COMPUTED IN ACCORDANCE WITH IEEE STD. 754. |
| +OV | FOR "ROUND TOWARD MINUS INFINITY", THE RESULT IS THE SAME AS IF +OV WERE REPLACED BY +HUGE; FOR ALL OTHER ROUNDING MODES, THE RESULT IS +OV. |
| $+\infty$ | THE RESULT IS THE SAME AS THE OPERAND. |
| NaN | THE RESULT IS THE SAME NaN VALUE, EXECPT THAT THE SIGN OF THE RESULT IS ALWAYS +. |

*FIG. 9*

| max | -∞ | -OV | -P | -UN | -0 | +0 | +UN | +P | +OV | +∞ | NaN |
|---|---|---|---|---|---|---|---|---|---|---|---|
| NaN | (c) | (d) | (f) | (g) | (f) | (f) | (g) | (f) | (d) | (c) | (j) |
| +∞ | (b) | (b) | (b) | (b) | (b) | (b) | (b) | (b) | (b) | (i) | (c) |
| +OV | +OV | +OV | +OV | +OV | +OV | +OV | +OV | +OV | +OV | (b) | (d) |
| +Q | +Q | +Q | +Q | +Q | +Q | +Q | +Q | (h) | +OV | (b) | (f) |
| +UN | +UN | +UN | +UN | +UN | +UN | +UN | +UN | +P | +OV | (b) | (g) |
| +0 | +0 | +0 | +0 | +0 | +0 | +0 | +UN | +P | +OV | (b) | (f) |
| -0 | -0 | -0 | -0 | -0 | -0 | +0 | +UN | +P | +OV | (b) | (f) |
| -UN | -UN | -UN | -UN | -UN | -0 | +0 | +UN | +P | +OV | (b) | (g) |
| -Q | -Q | -Q | (e) | -UN | -0 | +0 | +UN | +P | +OV | (b) | (f) |
| -OV | -OV | -OV | -P | -UN | -0 | +0 | +UN | +P | +OV | (b) | (d) |
| -∞ | (a) | -OV | -P | -UN | -0 | +0 | +UN | +P | +OV | +∞ | (c) |

FIG. 10

| min | −∞ | −OV | −Q | −UN | −0 | +0 | +UN | +Q | +OV | +∞ | NaN |
|---|---|---|---|---|---|---|---|---|---|---|---|
| −∞ | (a) | (b) | (b) | (b) | (b) | (b) | (b) | (b) | (b) | (b) | (c) |
| −OV | (b) | −OV | −OV | −OV | −OV | −OV | −OV | −OV | −OV | −OV | (d) |
| −Q | (b) | −OV | (e) | −Q | −Q | −Q | −Q | −Q | −Q | −Q | (f) |
| −UN | (b) | −OV | −P | −UN | −UN | −UN | −UN | −UN | −UN | −UN | (g) |
| −0 | (b) | −OV | −P | −UN | −0 | −0 | −0 | −0 | −0 | −0 | (f) |
| +0 | (b) | −OV | −P | −UN | −0 | +0 | +0 | +0 | +0 | +0 | (f) |
| +UN | (b) | −OV | −P | −UN | −0 | +0 | +UN | +UN | +UN | +UN | (g) |
| +Q | (b) | −OV | −P | −UN | −0 | +0 | +UN | (h) | +P | +P | (f) |
| +OV | (b) | −OV | −P | −UN | −0 | +0 | +UN | +P | +OV | +OV | (d) |
| +∞ | (b) | −OV | −P | −UN | −0 | +0 | +UN | +P | +OV | (i) | (c) |
| NaN | (c) | (d) | (f) | (g) | (f) | (f) | (g) | (f) | (d) | (c) | (j) |

FIG. 11

FLOATING POINT SYSTEM THAT REPRESENTS STATUS FLAG INFORMATION WITHIN A FLOATING POINT OPERAND

Applicant claims the right of priority based on U.S. Provisional Patent Application No. 60/293,173 filed May 25, 2001 in the name of Guy L. Steele, Jr.

DESCRIPTION OF THE INVENTION

1. Field of the Invention

The invention generally relates to systems and methods for performing floating point arithmetic computations, and more particularly to systems and methods for performing floating point computations which conform to behavior specified in IEEE Standard ("Std.") 754 using a modified or enhanced format for the floating point operand.

2. Background of the Invention

Digital electronic devices, such as digital computers, calculators, and other devices, perform arithmetic calculations on values in integer, or "fixed point," format, in fractional, or "floating point" format, or both. Those skilled in the art will appreciate that IEEE Standard 754 (hereinafter "IEEE Std. 754" or "the Standard") is a conventional standard that was published in 1985 by the Institute of Electrical and Electronic Engineers, and adopted by the American National Standards Institute (ANSI). IEEE Std. 754 defines several standard formats for expressing values in floating point format, and a number of aspects regarding behavior of computation in connection therewith.

Fundamentally and in accordance with IEEE Std. 754, a value in representation in floating point format comprises a plurality of binary digits, or "bits," having the structure $$se_{msb} \ldots e_{lsb} f_{msb} \ldots f_{lsb}$$

where bit "s" is a sign bit indicating whether the entire value is positive or negative. Bits "$e_{msb} \ldots e_{lsb}$" comprise an exponent field representing the exponent "e" in unsigned binary biased format. Finally, bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats, namely, a "single" format which comprises thirty-two bits, and a "double format which comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. Those skilled in the art will appreciate that the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats which are generally based on the bit patterns of the bits "$e_{msb} \ldots e_{lsb}$" comprising the exponent field and the bits "$f_{msb} \ldots f_{lsb}$" comprising the fraction field. The formats are generally depicted in FIG. 2. If a number is represented such that all of the bits "$e_{msb} \ldots e_{lsb}$" of the exponent field are binary one's (i.e., if the bits represent a binary-encoded value of "255" in the single format or "2047" in the double format) and all of the bits "$f_{msb} \ldots f_{lsb}$" of the fraction field are binary zeros, then the value of the number is positive or negative infinity, depending on the value of the sign bit "s." In particular, the value "v" is $v=(-1)^s \infty$, where "∞" represents the value "infinity" (reference format 33). On the other hand, if all of the bits "$e_{msb} \ldots e_{lsb}$" of the exponent field are binary one's and if the bits "$f_{msb} \ldots f_{lsb}$" of the fraction field are not all zero's, then the value that is represented is conventionally deemed "not a number" and abbreviated in the Standard as "NaN" (reference format 34).

If a number has an exponent field in which the bits "$e_{msb} \ldots e_{lsb}$" are neither all binary ones nor all binary zeros (i.e., if the bits represent a binary-encoded value between 1 and 254 in the single format or between 1 and 2046 in the double format), the number is said to be in a "normalized" format (reference format 32). For a number in the normalized format, the value represented by the number is $v=(-1)^s 2^{e-bias} (1.|f_{msb} \ldots f_{lsb})$, where "|" represents a concatenation operation. In the normalized format, there is an implicit most significant digit having the value "one." In this manner, 23 digits in the fraction field of the single format or 52 digits in the fraction field of the double format will effectively represent a value having 24 digits or 53 digits of precision, respectively, where the value is less than 2, but not less than 1.

On the other hand, if a number has an exponent filed in which the bits "$e_{msb} \ldots e_{lsb}$" are all binary zeros, representing the binary-encoded value of "zero," and a fraction field in which the bits $f_{msb} \ldots f_{lsb}$" are not all zero, the number is said to be in a "de-normalized" format (reference format 31). For a number in the de-normalized format, the value represented by the number is $v=(-1)^s 2^{e-bias+1}(0.|f_{msb} \ldots f_{lsb})$. For both single and double formats, it will be appreciated that the range of values of numbers that can be expressed in the de-normalized format is disjoint from the range of values of numbers that can be expressed in the normalized format.

Finally, if a number has an exponent field in which the bits "$e_{msb} \ldots e_{lsb}$" are all binary zeros, representing the binary-encoded value of "zero," and a fraction field in which the bits "$f_{msb} \ldots f_{lsb}$" are all zero, the number has the value "zero" (reference format 30). Depending on the value of the sign bit, it will be appreciated that the value "zero" may be positive zero or negative zero.

Generally, circuits or devices that perform floating point computations or operations (generally referred to as floating point units) conforming to IEEE Std. 754 are designed to generate a result in three steps:

(a) In the first step, an approximation calculation step, an approximation to the absolutely accurate mathematical result (assuming that the input operands represent the specific mathematical values as described by IEEE Std. 754) is calculated that is sufficiently precise as to allow this accurate mathematical result to be summarized. The summarized result is usually represented by a sign bit, an exponent (typically represented using more bits than are used for an exponent in the standard floating-point format), and some number "N" of bits of the presumed result fraction, plus a guard bit and a sticky bit. The value of the exponent will be such that the value of the fraction generated in step (a) consists of a 1 before the binary point and a fraction after the binary point. The bits are commonly calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 . . . and 1.011111 . . . as representations of the value "one-and-one-half"); let the N most significant bits of the infinite significand be used as the intermediate result significand; let the next bit of the infinite significand be the guard bit; and let the sticky bit be 0 if and only if ALL remaining bits of the infinite significant are 0-bits (in other words, the sticky bit is the logical OR of all remaining bits of the infinite fraction after the guard bit).

(b) In the second step, a rounding step, the guard bit, the sticky bit, perhaps the sign bit, and perhaps some of the bits of the presumed significand generated in step (a) are used to decide whether to alter the result of step (a). For conventional rounding modes defined by IEEE Std. 754, this is a decision as to whether to increase the magnitude of the number represented by the presumed exponent and fraction generated in step (a). Increasing the magnitude of the number is done by adding 1 to the significand in its least significant bit position, as if the significand were a binary integer. It will be appreciated that, if the significand is all 1-bits, the magnitude of the number is "increased" by changing it to a high-order 1-bit followed by all 0-bits and adding 1 to the exponent.

Regarding the rounding modes, it will be further appreciated that, (i) if the result is a positive number, and
  (a) if the decision is made to increase, effectively the decision has been made to increase the value of the result, thereby rounding the result up (i.e., towards positive infinity), but
  (b) if the decision is made not to increase, effectively the decision has been made to decrease the value of the result, thereby rounding the result down (i.e., towards negative infinity); and
(ii) if the result is a negative number, and
  (a) if the decision is made to increase, effectively the decision has been made to decrease the value of the result, thereby rounding the result down, but
  (b) if the decision is made not to increase, effectively the decision has been made to increase the value of the result, thereby rounding the result up.

For example, IEEE Std. 754 defines a round-toward-nearest mode in which the least significant bit (lsb) of the significand, the guard bit, and the sticky bit are examined to decide if an increase is made according to the following decision table:

TABLE 1

| lsb | guard | sticky | * | increase? |
|---|---|---|---|---|
| 0 | 0 | 0 | * | no |
| 0 | 0 | 1 | * | no |
| 0 | 1 | 0 | * | no |
| 0 | 1 | 1 | * | yes |
| 1 | 0 | 0 | * | no |
| 1 | 0 | 1 | * | no |
| 1 | 1 | 0 | * | yes |
| 1 | 1 | 1 | * | yes | where "sign" bit, "guard" refers to the guard bit, and "sticky" refers to the sticky bit, and "increase?" refers to the decision as to whether to increase the magnitude of the number generated in step (a). This may also be described by the Boolean expression "guard AND (lsb OR sticky)."

IEEE Std. 754 defines a round-toward-minus-infinity mode in which the decision as to whether to increase is made according to the following decision table:

TABLE 2

| sign | guard | sticky | * | increase? |
|---|---|---|---|---|
| 0 | 0 | 0 | * | no |
| 0 | 0 | 1 | * | no |
| 0 | 1 | 0 | * | no |
| 0 | 1 | 1 | * | no |
| 1 | 0 | 0 | * | no |
| 1 | 0 | 1 | * | yes |
| 1 | 1 | 0 | * | yes |
| 1 | 1 | 1 | * | yes |

This may also be described by the Boolean expression "(guard OR sticky) AND sign."

IEEE Std. 754 defines a round-toward-plus-infinity mode in which the decision as to whether to increase is made according to the following decision table:

TABLE 3

| sign | guard | sticky | * | increase? |
|---|---|---|---|---|
| 0 | 0 | 0 | * | no |
| 0 | 0 | 1 | * | yes |
| 0 | 1 | 0 | * | yes |
| 0 | 1 | 1 | * | yes |
| 1 | 0 | 0 | * | no |
| 1 | 0 | 1 | * | no |
| 1 | 1 | 0 | * | no |
| 1 | 1 | 1 | * | no |

This may also be described by the Boolean expression "(guard OR sticky) AND NOT sign."

Finally IEEE Std. 754 defines a round-toward-zero mode in which the decision as to whether to increase is made according to the following decision table:

TABLE 4

| sign | guard | sticky | * | increase? |
|---|---|---|---|---|
| 0 | 0 | 0 | * | no |
| 0 | 0 | 1 | * | no |
| 0 | 1 | 0 | * | no |
| 0 | 1 | 1 | * | no |
| 1 | 0 | 0 | * | no |
| 1 | 0 | 1 | * | no |
| 1 | 1 | 0 | * | no |
| 1 | 1 | 1 | * | no |

This may also be described by the Boolean expression "FALSE." It will be appreciated that, in the "round toward zero" mode, the decision is made never to increase.

(c) In the third step, a packaging step, a result is packaged into a standard floating-point format. This may involve substituting a special representation, such as the representation defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, it is assumed that this is the step that forces the result to be a NaN if any input operand is a NaN. In this step, the decision is also made as to whether the result should be an infinity. It will be appreciated that, if the result is to be a NaN or infinity, the original result will be discarded and an appropriate representation will be provided as the result.

FIG. 1 depicts the typical organization for a floating point unit 10 for a conventional prior art microprocessor capable of performing the floating point operations described above. With reference to FIG. 1, the floating point unit includes a number of circuits commonly referred to as functional units. These functional units include an adder 11, a multiplier 12, a divider 13, a square-root unit 14, a maximum/minimum unit 15 that delivers the larger or smaller of two operands, a comparator 16 that typically delivers one bit or a few bits describing a numerical relationship between two operands, and a tester 17 that examines just one operand and delivers one bit or a few bits describing numerical properties of the operand. The functional units are controlled by a control unit 20 that interprets program instructions, enables operands to be coupled from a set of floating point registers 21 onto respective operand buses 22 and 23, generates functional unit control signals that enable respective ones of the functional units 11 through 17 to receive the operand or operands and perform their respective operations to generate a result. If the functional unit control signals enable one of the functional units 11 through 16 to operate, the result is coupled onto a result bus 24 and stored in the floating point registers 21. In addition, if the functional unit control signals enable the comparator 16 or the tester 17 to operate, the result will be coupled to the control unit 20. Some functional units may be capable of delivering a result to the result bus in the same clock cycle that operands are presented to it. However, other functional units may be pipelined, in which case results are delivered during a clock cycle that is later than the clock cycle during which the corresponding operands were presented to the functional unit.

Functional units 11 through 14 also generate floating-point status information, which is typically coupled to a floating point status register 25 over floating-point status bus 26 for storage therein. The floating point status information is stored and/or accumulated in the floating point status register 25. The floating point status information generated for a particular floating point operation includes indications, for example, as to whether:

(i) a particular operand is invalid for the operation to be performed ("invalid operation");

(ii) if the operation to be performed is division, the divisor is zero ("division-by-zero");

(iii) an overflow occurred during the operation ("overflow");

(iv) an underflow occurred during the operation ("underflow"); and (v) the rounded result of the operation is not exact ("inexact").

These conditions are typically represented by flags that are stored in the floating point status register 25. The floating point status information can be read from the floating point status register 25 by the control unit 20 in the same manner as result bits from the comparator or tester, and this information can be used to dynamically control the operations performed by the floating point unit 10 in response to certain conditional floating point instructions, such as conditional branch, conditional move, and conditional trap instructions. The outcome of such conditional instructions typically relies upon accessing the floating point status information from the floating point status register 25.

Also, the floating point status information read from the floating point status register 25 may enable the control unit 20 to initiate processing of a trap sequence, which will interrupt the normal flow of program execution. In addition, status bits read from the floating point status register 25 may be used by the control unit 20 to affect certain ones of the functional unit control signals that it sends to the functional units, such as the functional unit control signals that control the rounding mode.

IEEE Std. 754 has brought relative harmony and stability to floating-point computation and architectural design of floating-point units. Moreover, its design was based on some important principles, and rests on a sensible mathematical semantics that eases the job of programmers and numerical analysts. It also supports the implementation of interval arithmetic, which may prove to be preferable to simple scalar arithmetic for many tasks. Nevertheless, IEEE Std. 754 has some serious drawbacks, including:

(i) Modes (e.g., the rounding modes and traps enabled/disabled mode), flags (e.g., flags representing the status information stored in floating point status register 25), and traps required to implement IEEE Std. 754 introduce implicit serialization issues. Implicit serialization is essentially the need for serial control of access (read/write) to and from globally used registers, such as the floating point status register 25. Under IEEE Std. 754, implicit serialization may arise between (1) different concurrent floating-point instructions and (2) between floating point instructions and the instructions that read and write the flags and modes. Furthermore, rounding modes may introduce implicit serialization because they are typically indicated as global state, although in some microprocessor architectures, the rounding mode is encoded as part of the instruction operation code, which will alleviate this problem to that extent. Thus, the potential for implicit serialization makes the Standard difficult to implement coherently and efficiently in today's superscalar and parallel processing architectures without loss of performance.

(ii) The implicit side effects of a procedure that can change the flags or modes can make it very difficult for compilers to perform optimizations on floating point code. As a result, compilers for most languages usually assume that every procedure call is an optimization barrier in order to be safe. This unfortunately may lead to further loss of performance.

(iii) Global flags, such as those that signal certain modes, make it more difficult to do instruction scheduling where the best performance is provided by interleaving instructions of unrelated computations. Thus, instructions from regions of code governed by different flag settings or different flag detection requirements cannot easily be interleaved when they must share a single set of global flag bits.

(iv) Furthermore, traps have been difficult to integrate efficiently into computing architectures and programming language designs for fine-grained control of algorithmic behavior.

As noted above, the rounding mode may be eliminated as a global state by statically encoding the rounding mode as part of the instruction operation code. However, there is no existing architecture that eliminates flags and the trap enabled/disabled mode as global state while still supporting similar exception detection capabilities. Thus, there is a need for a system that allows for more efficient processing of floating point operands which eliminates the need to separately access status information separate from the floating point operand data structure itself.

SUMMARY OF THE INVENTION

Methods, systems, data structures and articles of manufacture consistent with the present invention overcome these shortcomings with a new and improved type of floating point operand that advantageously and efficiently eliminates flags as global states while still supporting exception detection capabilities. In brief summary, a floating point unit supporting such an enhanced operand generates results in which floating point status information generated for an operation may be encoded in the result of the operation, i.e., within parts of the operand, and subsequently stored therewith in the floating point register set, instead of requiring a separate floating point status register to receive the status information. Since the floating point status information relating to a floating point operation is in the result generated for the operation, implicit serialization required by maintaining the floating point status information separate and apart therefrom can be advantageously obviated.

More particularly stated, a floating point operand data structure consistent with the present invention is broadly described herein. The floating point operand data structure can be used in floating point computations and processing within a processing device. The floating point data structure comprises a first portion having floating point operand data and a second portion having embedded status information associated with at least one status condition of the floating point operand data. The status condition may be determined from the embedded status information without regard to memory storage (such as a dedicated floating point status register) external to the data structure. The status condition may also be associated with at least one floating point operation that generated the enhanced floating point operand data structure. The outcome of a conditional floating point instruction may be based on the embedded status information without regard to contents of the floating point status register.

The second portion of the data structure may also have at least one bit that is indicative of the status condition from the group of an invalid operation status, an overflow status, an underflow status, a division by zero status, an infinity status, and an inexact status. More specifically, the overflow status may represent one in a group of a +OV status and a −OV status and may also represent a predetermined non-infinity numerical value. The underflow status may represent one in a group of a +UV status and a −UV status and may also represent a predetermined non-zero numerical value. The invalid status may represent a not-a-number (NaN) status due to an invalid operation. The infinity status may represent one in a group of a positive infinity status and a negative infinity status. The second portion of the data structure may also include bits indicative of a predetermined type of operand condition resulting in the NaN status or another type of operand condition resulting in the infinity status.

Using such an enhanced type of data structure for a floating point operand, it will be appreciated that addition, multiplication, maximum and minimum floating point operations on the data structure are commutative.

In still another aspect of the present invention, a floating point system is broadly described that is consistent with an embodiment of the present invention. The system is associated with a processing device, such as a microprocessor, for performing at least one floating point operation on a floating point operand. The system includes an operand memory storage, a control unit and a first functional unit. The operand memory storage device maintains the floating point operand. The control unit is in communication with the operand memory storage device and receives the floating point instruction associated with the floating point operation to generate at least one control signal related to the floating point operation. The first functional processing unit is in communication with the operand memory storage device and the control unit. The first functional processing unit is capable processing the floating point operand and storing status information within the processed floating point operand. Typically, the status information has at least one bit that is indicative of an operand status condition from the group of an invalid operation status, an overflow status, an underflow status, a division by zero status, an infinity status, and an inexact status.

In still another aspect of the present invention, a method for encoding a floating point operand with status information is described that is consistent with an embodiment of the present invention. The method begins by determining a status condition of the floating point operand prior to execution of a floating point operation on the floating point operand. The method stores an updated status condition of the floating point operand within the floating point operand after execution of the floating point operation on the floating point operand.

In more detail, determining the status condition may include identifying the status condition of the floating point operand from only embedded status information within the floating point operand. The status condition is typically from the group of an invalid operation status, an overflow status, an underflow status, a division by zero status, an infinity status, and an inexact status. Furthermore, storing the updated status condition may include embedding updated status information within the floating point operand after execution of the floating point operation. Such updated status information typically represents the updated status condition of the processed floating point operand. The updated status condition is typically from the group of an invalid operation status, an overflow status, an underflow status, a division by zero status, an infinity status, and an inexact status. The updated status condition may be indicative of a previous floating point operation that resulted in the floating point operand.

The method may also include conditioning a subsequent floating point operation based only upon the updated status information within the floating point operand. Additionally, the method may include processing an additional floating point operand and storing updated status information related to the additional floating point operand within the additional floating point operand while the updated status information related to the other floating point operand is preserved.

In still another aspect of the present invention, a computer-readable medium is described that is consistent with an embodiment of the present invention. The medium stores a set of instructions for encoding a floating point operand with status information. When executed, the instructions perform the encoding method as described above.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

The scope of the present invention is pointed out with particularity in the appended claims. The above and further advantages of this invention may be better understood by referring to the following description taken in conjunction with the accompanying drawings, in which:

FIGS. 5 through 11 depict exemplary tables that are useful in understanding the operations of exemplary functional units of the floating point unit depicted in FIG. 3 and consistent with an embodiment of the present invention.

DESCRIPTION OF THE EMBODIMENTS

Reference will now be made in detail to exemplary embodiments of the present invention, examples of which are illustrated in the accompanying drawings. Wherever possible, the same reference numbers will be used throughout the drawings to refer to the same or like parts.

Figure 3:
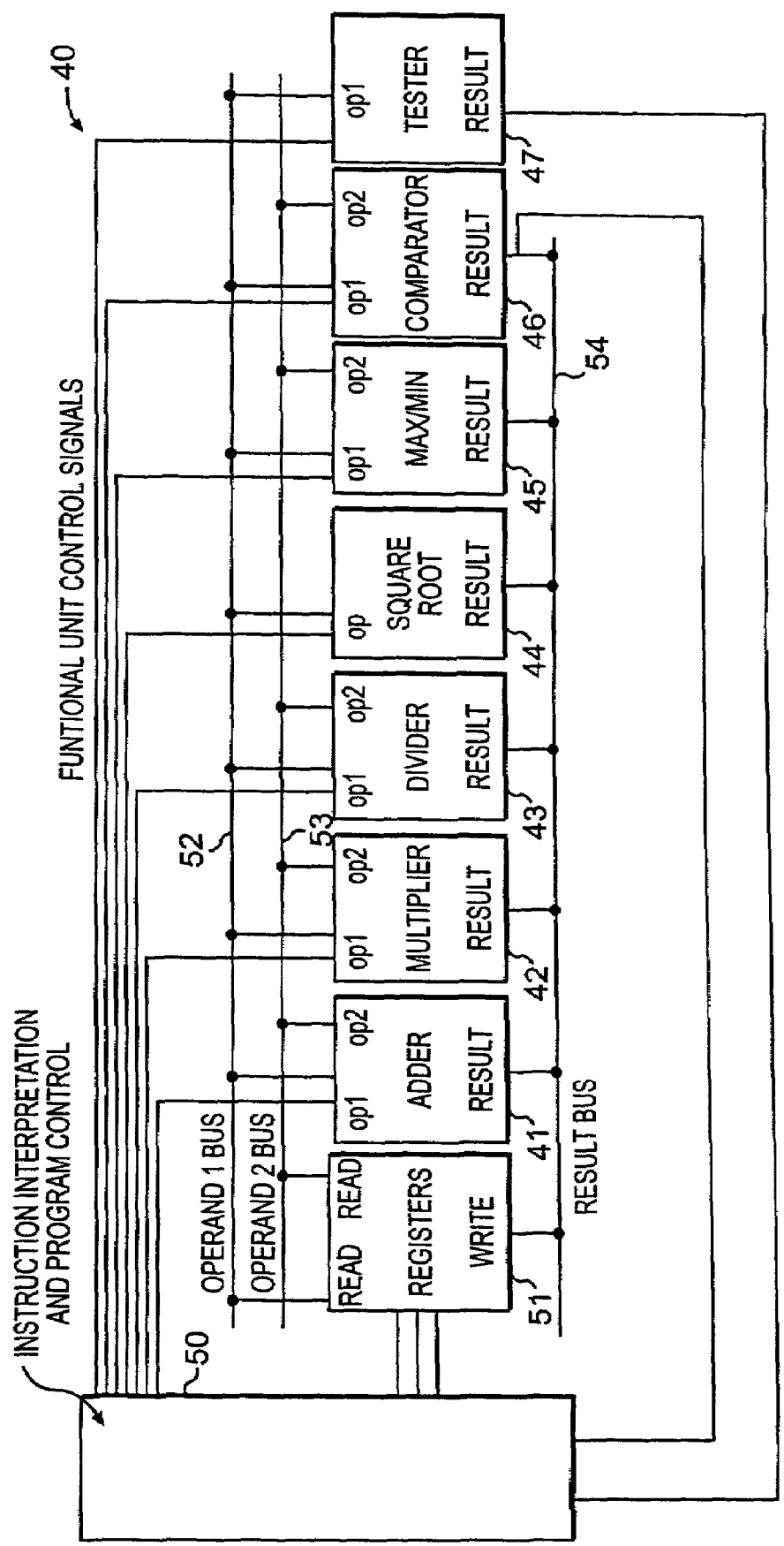
FIG. 3 is a functional block diagram of an exemplary floating point unit consistent with an embodiment of the present invention.

FIG. 3 is a functional block diagram of an exemplary floating point unit 40 consistent with an embodiment of the present invention. With reference to FIG. 3, floating point unit 40 includes plurality of exemplary functional units. In the exemplary embodiment, these functional units include an adder unit 41, a multiplier unit 42, a divider unit 43, a square root unit 44, a maximum/minimum unit 45, a comparator unit 46 and a tester unit 47, all of which operate under control of functional unit control signals provided by a control unit 50. As with the floating point unit 10 depicted in FIG. 1, the control unit 50 can enable one or two operands to be coupled from at least one of floating point registers 51 onto respective operand buses. In the exemplary embodiment, two operand buses 52 and 53 are illustrated and provide the operands to operand inputs of the respective functional units 41 through 47. Those skilled in the art will recognize that the principles of the present invention contemplate alternative embodiments using single or multiple operand communication pathways in a variety of alternative communication pathway architectures.

The adder 41 receives two operands "x" and "y" and generates the result of the sum $S(x,y)=x+y$ of the operands. The multiplier 42 also receives two operands and generates the result as the multiplicative product $P(x,y)=x*y$ of the values represented by the operands. The divider 43 can perform two types of operations. In one type of operation, which will be referred to as "division," the divider 43 receives two operands and generates the result as the quotient $Q(x,y)=x/y$ of one operand divided by the other operand. In a second operation, which will be referred to as "remainder," the divider receives two operands and generates the result as the remainder $REM(x,y)=x-(y*n)$, where "n" is an integer nearest the value x/y. The square root unit 44 receives one operand and generates a result as the square root $SR(x)=sqrt(x)$ of the operand. The maximum/minimum unit 45 receives two operands and couples one of the maximum $MAX(x,y)$ or minimum $MIN(x,y)$ of the two operands. The comparator unit 46 also receives two operands and identifies which, if either, operand is greater than the other (or equivalently, which operand is less than the other). The tester unit 47 receives one operand and provides a result comprising one bit or a few bits describing numerical properties of the operand, as will be described below.

As noted above, the exemplary control unit 50 generates functional unit control signals that control exemplary functional units 41 through 47. The exemplary control unit 50 operates in response to floating point instructions provided thereto by a conventional arrangement not depicted in FIG. 3, but which will be familiar to those skilled in the art. In response to the floating point instructions and conventional status signals (not shown, but which will also be apparent to those skilled in the art), the control unit 50 generates register control signals that enable the operands to be coupled from the registers 51 onto one or more operand buses 52 and 53. Examples of such "status signals" may include results from the comparator and tester as well as status signals (such as zero, negative, carry, or overflow) from an integer unit or "I/O transfer complete" from an input/output unit.

The control unit also generates functional unit control signals that enable respective ones of the functional units 41 through 47 to receive the operands from the operand buses 52 and 53, process the operands accordingly and generate results based upon such processing. In addition, except for results generated by functional unit 47 (the tester unit), control unit 50 generates register control signals that enable the results to be stored in registers 51. In the embodiment with functional units 41 through 46, the results are coupled onto a result bus 54, which transfers the results to the registers 51 for storage therein. In this manner, control unit 50 is indirectly provided with the resulting operands having updated status information encoded or embedded within the operand itself.

The results generated by the comparator unit 46 and tester unit 47 are typically directly coupled to the control unit 50 for use thereby in a conventional manner. In the embodiment illustrated in FIG. 3, comparator unit 46 is also connected to result bus 54 so that results may also be indirectly coupled to control unit 50 via register 51. Further, it is contemplated that another embodiment of the present invention may be implemented such that results generated by tester unit 47 may be indirectly coupled to control unit 50 via result bus 54.

Figure 1:
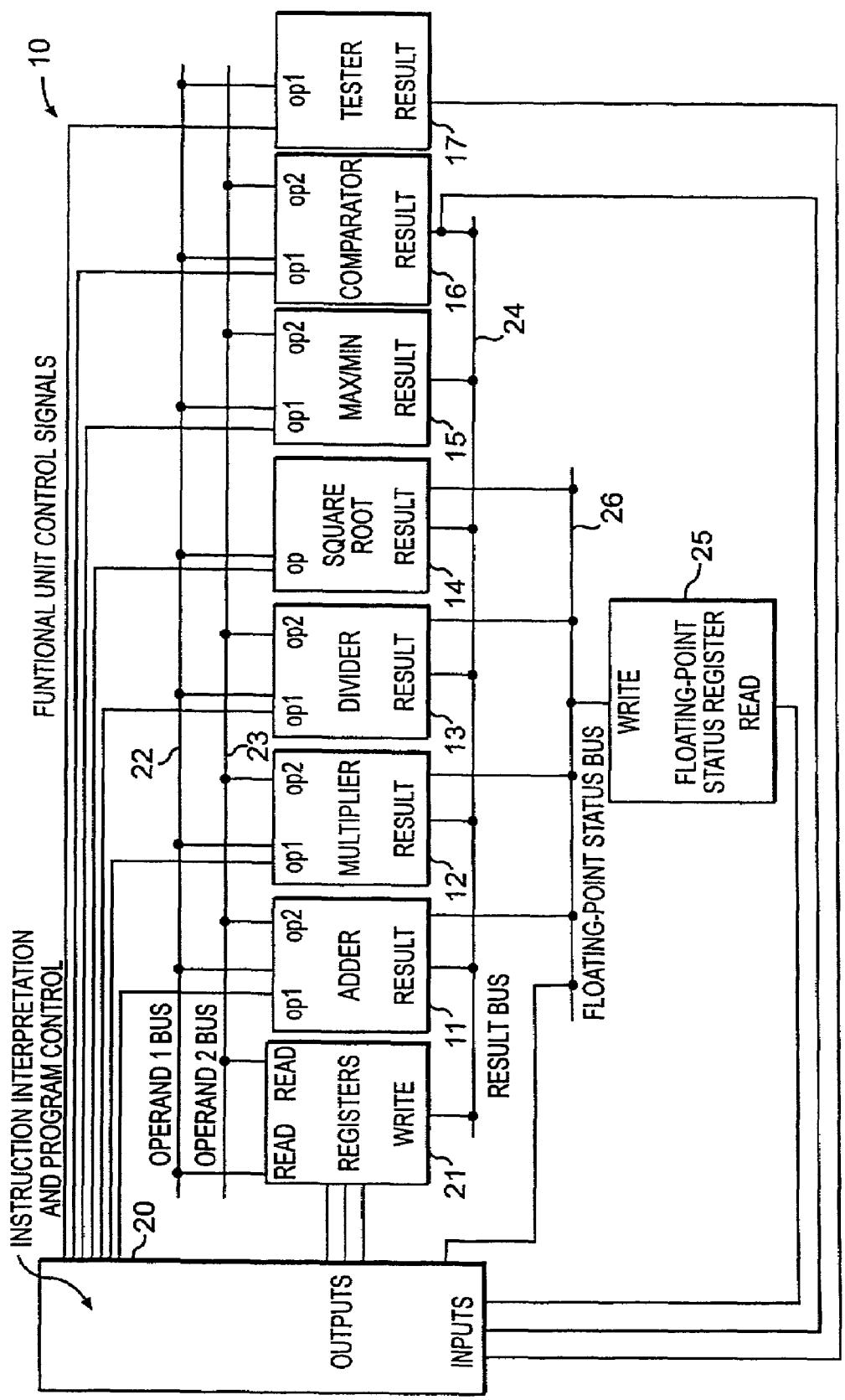
FIG. 1 is a functional block diagram of a prior art floating point unit.
Figure 4:
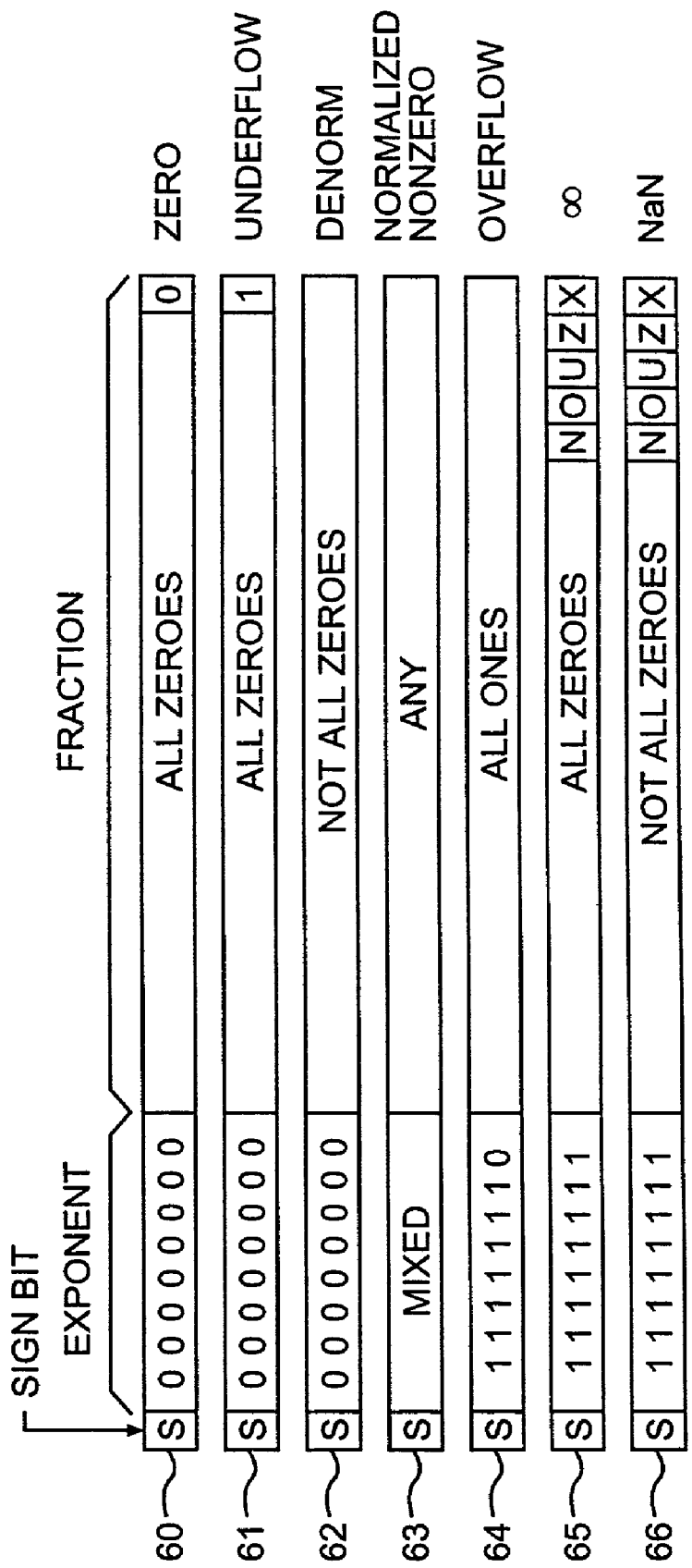
FIG. 4 depicts exemplary floating point operand data structure formats for representations of floating point operand values generated by the exemplary floating point unit depicted in FIG. 3 and consistent with an embodiment of the present invention.

It should be noted that floating point unit 40 does not include a floating point status register for storing floating point status information, which is provided in the prior art floating point unit 10 depicted in FIG. 1. Instead, the functional units advantageously encode the floating point status information in results (e.g., enhanced or modified floating point operand data structures) that are generated in certain formats. These data structure formats will be illustrated in connection with FIG. 4, which depicts floating point formats of operands that the functional units 41-47 may receive and formats of results that they generate. With reference to FIG. 4, seven formats are depicted, including a zero format 60, an underflow format 61, a denormalized format 62, a normalized non-zero format 63, and overflow format 64, an infinity format 65 and a not-a-number (NaN) format 66.

Figure 2:
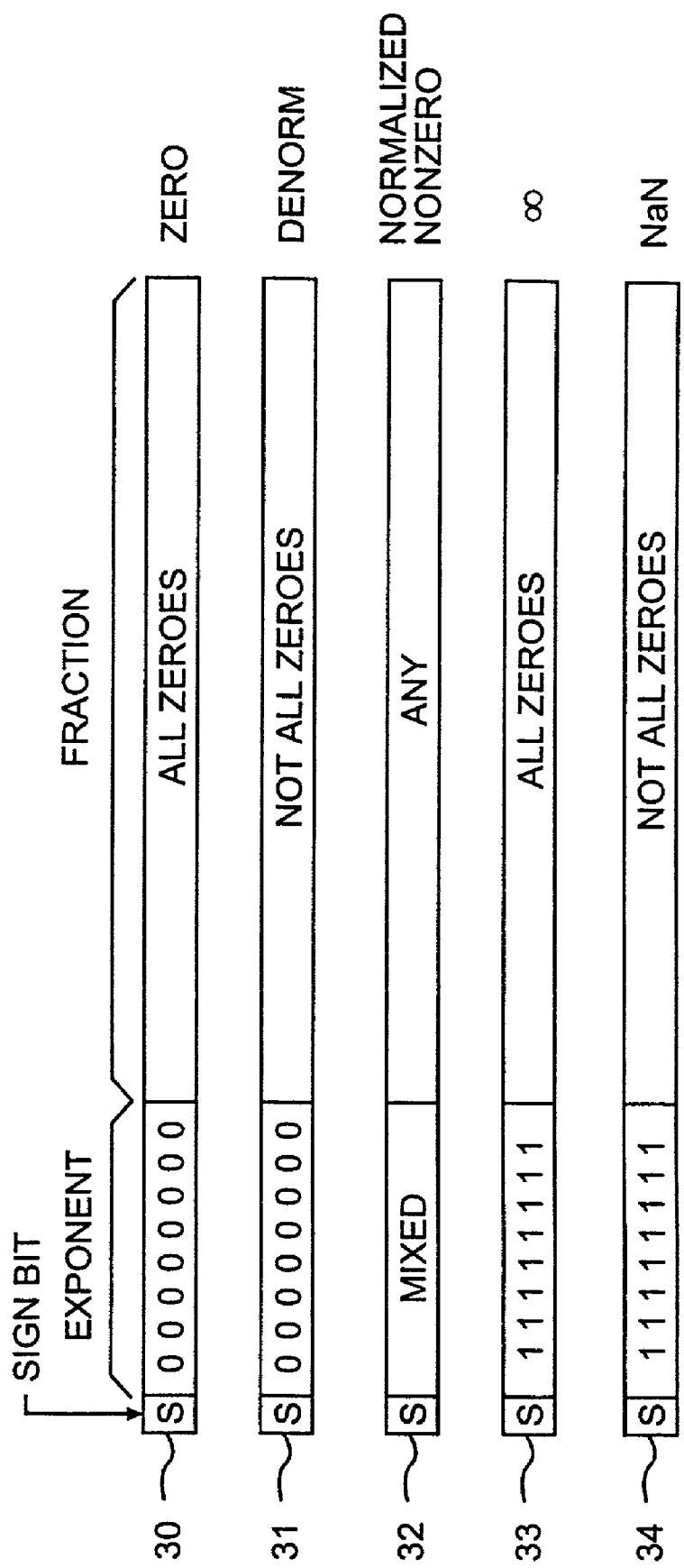
FIG. 2 depicts prior art formats for representations of floating point values generated by the floating point unit depicted in FIG. 1.

The zero format 60, which has the same format as conventional zero format 30 (FIG. 2), is used to represent the values "zero." More specifically, the zero format 60 represents positive or negative zero, depending on the value of "s," the sign bit.

The underflow format 61 provides a mechanism by which a functional unit, such as units 41 through 45, can indicate that the result of a computation is an underflow. In the embodiment illustrated in FIG. 4, the underflow format has a sign bit "s" that indicates whether the result is positive or negative, bits $e_{msb} \ldots e_{lsb}$ of the exponent field that are all binary zero's, and bits $f_{msb} \ldots f_{lsb+1}$ of the fraction field, except for the least significant bit, that are all binary zero's. The least significant bit $f_{lsb}$ of the fraction field is a binary one.

The denormalized format 62, except in the case of the values represented by the underflow format 61, and normalized non-zero format 63 have the same format as the prior art denormalized and normalized non-zero formats 31 and 32 (FIG. 2) and are used to represent substantially the same range of values.

The overflow format 64 provides a mechanism by which a functional unit, such as units 41 through 45, can indicate that the result of a computation is an overflow. In the embodiment illustrated in FIG. 4, the overflow format 64 has a sign bit "s" that indicates whether the result is positive or negative and bits $e_{msb} \ldots e_{lsb+1}$ of the exponent field that are all binary ones, with the least significant bit $e_{lsb}$ being zero. The bits $f_{msb} \ldots f_{lsb}$ of the fraction field are all binary ones.

The infinity format 65 provides a mechanism by which a functional unit, such as units 41 through 45, can indicate that the result is infinite. In the embodiment illustrated in FIG. 4, the infinity format 65 has a sign bit "s" that indicates whether the result is positive or negative, bits $e_{msb} \ldots e_{lsb}$ of the exponent field that are all binary ones, and bits $f_{msb} \ldots f_{lsb+5}$ of the fraction field that are all binary zero's. The five least significant bits $f_{lsb+4} \ldots f_{lsb}$ of the fraction field are flags, which will be described below.

The NaN (not-a-number) format 66 provides a mechanism by which a functional unit, such as units 41 through 45, can indicate that the result is not a number. In the embodiment illustrated in FIG. 4, the NaN format has a sign bit "s" that can be any value, the bits $e_{msb} \ldots e_{lsb}$ of the exponent field are all binary ones, and bits $f_{msb} \ldots f_{lsb+5}$ of the fraction field that are not all binary zero's. The five least significant bits $f_{lsb+4} \ldots f_{lsb}$ of the fraction field are flags, which will be described below.

As noted above, in both values represented in the infinity format 65 and the NaN format 66, the five low order bits $f_{lsb+4} \ldots f_{lsb}$ of the fraction field are deemed to be flags. In the illustrated embodiment, the five flags include the flags that are defined by IEEE Std. 754, including an invalid operation flag "n," an overflow flag "o," an underflow flag "u," a division-by-zero flag "z," and an inexact flag "x." For example, a value in the NaN format 66 in which both the overflow flag "o" and the division-by-zero flag "z" are set, indicates that the resulting operand value represents a result of a computation that caused an overflow (this from the overflow flag "o") as well as an attempt to divide by zero (this from the division-by-zero flag "z"). It should be noted that the flags provide the same status information as provided by prior art floating point status register 24 in prior art floating point unit 10. However, the status information is provided as an embedded part of the result and stored therewith in the registers 51. As a result, the control unit 50 can advantageously enable multiple instructions to be contemporaneously executed because the floating point status information generated and stored during execution of one instruction will not over-write previously-stored floating point status information generated during execution of another instruction. In this manner, the floating point status information for each floating point operation is advantageously preserved from being over-written and lost in a computationally intensive computing architecture.

In addition to including status information in the five low-order bits $f_{lsb+4} \ldots f_{lsb}$ of the fraction field for values in the NaN format 66, other information may also be encoded in the next five low-order bits $f_{lsb+9} \ldots f_{lsb+5}$. If the value in the NaN format 66 is the result of an operation, the other information may indicate the operation and types of operands that gave rise to the result. In one embodiment, the other information is associated with binary encoded values (BEV) of the those bits $f_{lsb+5} \ldots f_{lsb\_5}$ as follows in Table 5.

TABLE 5

| Bit Pattern Of Result | REV of $f_{lsb+9} \ldots f_{lsb+5}$ | Meaning |
|---|---|---|
|  | 0 or 1 | no specific meaning |
| s 11111111 100000000000000010nouzx | 2 | infinity minus infinity |
| s 11111111 100000000000000011nouzx | 3 | OV minus OV |
| s 11111111 100000000000000100nouzx | 4 | zero times infinity |
| s 11111111 100000000000000101nouzx | 5 | UN times OV |
|  | 6 or 7 | no specific meaning |
| s 11111111 100000000000001000nouzx | 8 | zero divided by zero |
| s 11111111 100000000000001001nouzx | 9 | infinity divided by infinity |
| s 11111111 100000000000001010nouzx | 10 | UN divided by UN |
| s 11111111 100000000000001011nouzx | 11 | OV divided by OV |
| s 11111111 100000000000001100nouzx | 12 | square root of less than zero |
|  | 13-16 | no specific meaning |
| s 11111111 100000000000010001nouzx | 17 | remainder by zero |
| s 11111111 100000000000010010nouzx | 18 | remainder by UN |
| s 11111111 100000000000010011nouzx | 19 | remainder by OV |
| s 11111111 100000000000010100nouzx | 20 | remainder of infinity |
| s 11111111 100000000000010101nouzx | 21 | remainder of infinity by zero |
| s 11111111 100000000000010110nouzx | 22 | remainder if infinity by UN |
| s 11111111 100000000000010111nouzx | 23 | remainder of infinity by OV |
| s 11111111 100000000000011000nouzx | 24 | remainder of OV |
| s 11111111 100000000000011001nouzx | 25 | remainder of OV by zero |
| s 11111111 100000000000011010nouzx | 26 | remainder of OV by UN |
| s 11111111 100000000000011011nouzx | 27 | remainder of OV by OV |
|  | 28-31 | no specific meaning |

In Table 5, "OV" refers to an operand in the overflow format 64, "UN" refers to an operand in the underflow format 61 and "infinity" refers to an operand in the infinity format 65. Further, it will be assumed that the above listed formats represent thirty-two bit values. Those skilled in the art will readily appreciate that such formats are easily extended to, for example, sixty-four bit values or values represented in other numbers of bits.

It will also be appreciated that, by including the floating point status information relating to a floating point operation embedded within the result generated for the operation, the implicit serialization required by maintaining the floating point status information separate and apart therefrom can be advantageously obviated.

With this background, exemplary functional units 41-47 for use in connection with exemplary floating point operand data structure formats 60 through 66 will be described in detail in connection with FIGS. 5 through 11. Before proceeding to those descriptions, it will be convenient to define certain terms. The term +OV generally represents a value in the overflow pattern with the sign bit "s" having the value "zero," indicating a positive value. The term −OV generally represents a value in the in the overflow pattern with the sign bit "s" having the value "one," indicating a negative value. The term +UN generally represents a value in the underflow pattern with the sign bit "s" having the value "zero," indicating a positive value. Finally, the term −UN generally represents a value in the underflow pattern with the sign bit "s" having the value "one," indicating a negative value.

Additionally, the following table defines certain other finite nonzero numbers, such as +TINY, −TINY, +HUGE, and −HUGE as follows:

TABLE 6

| | |
|---|---|
| 0 00000000 00000000000000000000010 | +TINY |
| 1 00000000 00000000000000000000010 | −TINY |
| 0 11111110 11111111111111111111110 | +HUGE |
| 1 11111110 11111111111111111111110 | −HUGE |

The numbers +TINY, −TINY, +HUGE, and −HUGE are helpful in further defining +OV, −OV, +UN, and −UN. For example, +OV can be deemed to refer to "some (or any) value that is strictly between +HUGE and +∞" and +UN can be deemed to refer to "some (or any) value that is strictly between +0 and +TINY." Similarly, −OV can be deemed to refer to "some (or any) value that is strictly between −HUGE and −∞" and −UN can be deemed to refer to "some (or any) value that is strictly between −0 and −TINY." These names will be used in the following description to aid in the description of how the exemplary functional units 41-47 operate and process a floating point operand having status information embedded within it.

Adder Unit 41

An illustrative circuit for use as adder unit 41 is described in U.S. patent application Ser. No. 10/035,595, filed on even date herewith in the name of Guy L. Steele Jr., and entitled "Floating Point Adder Circuit And Method", assigned to the assignee of the present application and hereby incorporated by reference. The exemplary adder unit 41 performs several types of operations, which may include but is not limited to addition of two operands, negation of one operand, subtraction of one operand from another operand, and absolute value of one operand. Generally, the negation operation is not affected by the rounding mode, and the result is always a copy of the operand with its sign reversed, even if the operand is in the NaN format 66. In the subtraction operation, the adder unit 41 generates the result as the sum of the operand that is the minuend and the negative of the operand that is the subtrahend. Essentially, the negative of the operand that is the subtrahend being the result of the negation operation. Effectively, the adder unit 41 performs a subtraction operation by performing a negation operation on the operand that is the subtrahend and an addition operation in connection with the operand that is the minuend and the result of the negation operation. The absolute value operation is also not affected by the rounding mode, and the result is a copy of the operand with its sign made positive, even if the operand is a NaN.

Generally, results generated by the adder unit 41 in connection with an addition operation are described in FIG. 5. In the table depicted in FIG. 5, "+P" or "+Q" means any finite positive nonzero representable value other than +UN and +OV. The label "−P" or "−Q" means any finite negative nonzero representable value other than −UN and −OV. Additionally, "NaN" means any value whose exponent field is 11111111, other than one of the values represented by +∞ and −∞.

Furthermore, the following is a key to symbols in the table depicted in FIG. 5:

(a) The result is −∞, with the five least significant bits $f_{lsb+4} \ldots f_{lsb}$ of the fraction field of the result being the bitwise OR of the five least significant bits $f_{lsb+4} \ldots f_{lsb}$ of the fraction fields of the two operands.

(b) The result −∞, with the five least significant bits $f_{lsb+4} \ldots f_{lsb}$ of the result being the bitwise OR of the five least significant bits $f_{lsb+4} \ldots f_{lsb}$ of the fraction of the infinite operand with bit pattern 01001 (to indicate overflow and inexact conditions).

(c) The result is −∞, with the five least significant bits $f_{lsb+4} \ldots f_{lsb}$ of the fraction field of the result equal to the five least significant bits $f_{lsb+4} \ldots f_{lsb}$ of the fraction field of the infinite operand. If the other operand is −UN or +UN, it is intentional in the present embodiment that the low five bits of the −∞ operand not be OR-ed with 0010 to indicate underflow and inexact conditions.

(d) For "round toward positive infinity," the result is +∞; for "round toward negative infinity," the result is −∞. In either of these two cases, the five least significant bits $f_{lsb+4} \ldots f_{lsb}$ of the fraction field of the result are the bitwise OR of the five least significant bits $f_{lsb+4} \ldots f_{lsb}$ of the fraction fields of the two operands. For all other rounding modes, the result is the positive NaN value 0 11111111 10000000000000000101ouzx (to indicate "infinity minus infinity" with the invalid operation flag set). The four least significant bits $f_{lsb+3} \ldots f_{lsb}$ of the fraction field of the result are the bitwise OR of the four least significant bits $f_{lsb+3} \ldots f_{lsb}$ of the fraction fields of the two operands.

(e) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction fields of the two operands.

(f) For "round toward plus infinity," the result is the same as if −OV were replaced by −HUGE and +UN were replaced by +TINY, i.e., the result will be 1 1111110 11111111111111111111110). For all other rounding modes, the result is −OV.

(g) For "round toward plus infinity," the result is the same as if −OV were replaced by −HUGE. For all other rounding modes, the result is −OV.

(h) For "round toward plus infinity," the result is +OV. For "round toward minus infinity," the result is −OV. For all other rounding modes, the result is the positive NaN value 0 11111111 10000000000000001111001, which indicates "OV minus OV" with the invalid operation "n," overflow "o," and inexact "x" flags set.

(i) The result is +∞, with the five least significant bits $f_{lsb+4} \ldots f_{lsb}$ of the fraction field of the result being the bitwise OR of the five least significant bits $f_{lsb+4} \ldots f_{lsb}$ of the fraction field of the infinite operand with 01001 (to indicate overflow and inexact conditions).

(j) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction field of the NaN operand with 01001 (to indicate overflow and inexact conditions).

(k) As computed in accordance with IEEE Std. 754, except that the result is –OV if overflow occurs or if the rounding mode is "round toward minus infinity" and the mathematical sum is less than –HUGE.

(l) For "round toward plus infinity," the result is the same as if –UN were replaced by –0; for "round toward minus infinity," the result is the same as if –UN were replaced by –TINY. For all other rounding modes, the result is as computed in accordance with IEEE Std. 754.

(m) For "round toward plus infinity," the result is the same as if +UN were replaced by +TINY. For "round toward minus infinity," the result is the same as if +UN were replaced by +0. For all other rounding modes, the result is as computed in accordance with IEEE Std. 754.

(n) As computed in accordance with IEEE Std. 754. If IEEE Std. 754 would compute the result as 1 00000000 00000000000000000000001, then an embodiment of the present invention would do the same. However, the embodiment of the present invention calls this –UN and considers it to be underflow. If IEEE Std. 754 would compute the result as 0 00000000 00000000000000000000001, then an embodiment of the present invention would do the same. However, the embodiment of the present invention calls this +UN and considers it to be underflow.

(o) For "round toward minus infinity," the result is the same as if +OV were replaced by +HUGE. For all other rounding modes, the result is +OV.

(p) The result is +∞ with the five least significant bits $f_{lsb+4} \ldots f_{lsb}$ of the fraction field of the result being equal to the five least significant bits $f_{lsb+4} \ldots f_{lsb}$ of the fraction field of the infinite operand. If the other operand is –UN or +UN, it is intentional in this embodiment that the five least significant bits $f_{lsb+4} \ldots f_{lsb}$ of the fraction field of the +∞ operand not be OR-ed with 00101 to indicate underflow and inexact conditions.

(q) The result is a copy of the NaN operand.

(r) For "round toward minus infinity," the result is the same as if each –UN were replaced by –TINY (i.e., the result will be –2*TINY). For all other rounding modes, the result is –UN.

(s) For "round toward minus infinity," the result is –UN. For all other rounding modes, the result is +UN.

(t) For "round toward minus infinity," the result is the same as if +OV were replaced by +HUGE and –UN were replaced by –TINY, i.e., the result will be 0 11111110 11111111111111111111110. For all other rounding modes, the result is +OV.

(u) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction field NaN operand with 00101 (to indicate underflow and inexact conditions).

(v) For "round toward minus infinity," the result is –0. For all other rounding modes, the result is +0. This is as in accordance with IEEE Std. 754.

(w) For "round toward plus infinity," the result is the same as if each +UN were replaced by +TINY, i.e., the result will be +2*TINY. For all other rounding modes, the result is +UN.

(x) As computed in accordance with IEEE Std. 754, except that if overflow occurs, or if the rounding mode is "round toward plus infinity" and the mathematical sum is greater than +HUGE, the result is +OV.

(y) The result is +∞, with the five least significant bits $f_{lsb+4} \ldots f_{lsb}$ of the fraction field of the result being the bitwise OR of the five least significant bits $f_{lsb+4} \ldots f_{lsb}$ of the fraction fields of the operands.

(z) The result is a copy of the NaN operand that has the larger value in its fraction field, except that the five least significant bits $f_{lsb+4} \ldots f_{lsb}$ of the fraction field of the result are the bitwise OR of the five least significant bits $f_{lsb+4} \ldots f_{lsb}$ of the operands. Additionally, the sign bit "s" of the result is "one" if and only if the sign bits of the two NaN operands are both "ones."

It will be appreciated by one with skill in the art that, with exemplary adder unit 41 operating according to the table depicted in FIG. 5, addition is commutative, even those cases where one or both operands are NaN values.

Multiplier Unit 42

An illustrative circuit for use as multiplier unit 42 is described in U.S. patent application Ser. No. 10/035,580, filed Jan. 15, 2002, which is assigned to the assignee of the present application and hereby incorporated by reference. Generally, results generated by the exemplary multiplier 42 are described in the table depicted in FIG. 6. In the table of FIG. 6, the term "+P" or "–Q" means any finite positive representable value greater than "one," other than +OV. The term "–P" or "–Q" means any finite negative representable value less than negative-one, other than –OV. The term "+R" or "–S" means any positive non-zero value less than "one," other than +UN. The term "–R" or "–S" means any negative non-zero representable value greater than negative-one, other than –UN. Finally, "NaN" means any value whose exponent field is 11111111, other than one of the values represented by +∞ and –∞.

Furthermore, the following is a key to symbols in the table depicted in FIG. 6:

(a) The result is +∞, with the five least significant bits $f_{lsb+4} \ldots f_{lsb}$ of the fraction field of the result being the bitwise OR of the five least significant bits $f_{lsb+4} \ldots f_{lsb}$ of the fraction fields of the two operands.

(b) The result is +∞, with the five least significant bits $f_{lsb+4} \ldots f_{lsb}$ of the fraction field of the result being the bitwise OR of the five least significant bits $f_{lsb+4} \ldots f_{lsb}$ of the fraction field of the infinite operand with 01001 (to indicate overflow and inexact conditions).

(c) The result is +∞, with the five least significant bits $f_{lsb+4} \ldots f_{lsb}$ of the fraction field of the result being equal to the five least significant bits $f_{lsb+4} \ldots f_{lsb}$ of the fraction field of the infinite operand.

(d) The result is +∞, with five least significant bits $f_{lsb+4} \ldots f_{lsb}$ of the fraction field of the result being the bitwise OR of the five least significant bits $f_{lsb+4} \ldots f_{lsb}$ of the fraction field of the infinite operand with 00101 (to indicate underflow and inexact conditions).

(e) For "round toward plus infinity," the result is +∞, with the five least significant bits $f_{lsb+4} \ldots f_{lsb}$ of the fraction field of the result being equal to the five least significant bits $f_{lsb+4} \ldots f_{lsb}$ of the fraction field of the infinite operand. For "round toward minus infinity," the result is +0. For all other rounding modes, the result is a positive NaN value 0 11111111 10000000000000001001ouzx (to indicate "zero times infinity" with the invalid operation flag set), where "ouzx" are the four least significant bits $f_{lsb+3} \ldots f_{lsb}$ of the fraction field of the infinite operand.

(f) For "round toward plus infinity," the result is −0. For "round toward minus infinity," the result is −∞, with five least significant bits $f_{lsb+4} \ldots f_{lsb}$ of the fraction field being equal to the five least significant bits $f_{lsb+4} \ldots f_{lsb}$ of the fraction field of the infinite operand. For all other rounding modes, the result is a negative NaN value 1 11111111 10000000000000001001ouzx (to indicate "zero times infinity" with the invalid operation flag set), where "ouzx" are the four least significant bits $f_{lsb+3} \ldots f_{lsb}$ of the fraction field of the infinite operand.

(g) The result is −∞, with five least significant bits $f_{lsb+4} \ldots f_{lsb}$ of the fraction field of the result being the bitwise OR of the five least significant bits $f_{lsb+4} \ldots f_{lsb}$ of the fraction field of the infinite operand with 00101 (to indicate underflow and inexact conditions).

(h) The result is −∞, with the five least significant bits $f_{lsb+4} \ldots f_{lsb}$ of the fraction field of the result being equal to the five least significant bits $f_{lsb+4} \ldots f_{lsb}$ of the fraction field of the infinite operand.

(i) The result is −∞, with the five least significant bits $f_{lsb+4} \ldots f_{lsb}$ of the fraction field of the result being the bitwise OR of the five least significant bits $f_{lsb+4} \ldots f_{lsb}$ of the fraction field of the infinite operand with 01001 (to indicate overflow and inexact conditions).

(j) The result is −∞, with the five least significant bits $f_{lsb+4} \ldots f_{lsb}$ of the fraction field of the result being the bitwise OR of the five least significant bits $f_{lsb+4} \ldots f_{lsb}$ of the fraction fields of the operands.

(k) The result is a copy of the NaN operand, except that its sign is reversed if the other operand is negative, and the five least significant bits $f_{lsb+4} \ldots f_{lsb}$ of the fraction field of the result being the bitwise OR of the five least significant bits $f_{lsb+4} \ldots f_{lsb}$ of the fraction fields of the operands.

(l) For "round toward minus infinity," the result is the same as if −OV were replaced by −HUGE. For all other rounding modes, the result is +OV.

(m) For "round toward plus infinity," the result is +OV. For "round toward minus infinity," the result is +UN; for all other rounding modes, the result is the positive NaN value 0 11111111 10000000000000010111101 (to indicate "UN times OV" with the invalid operation, overflow, underflow, and inexact flags set).

(n) For "round toward plus infinity," the result is −UN. For "round toward minus infinity," the result is −OV. For all other rounding modes, the result is the negative NaN value 1 11111111 10000000000000010111101 (to indicate "UN times OV" with the invalid operations, overflow, underflow, and inexact flags set).

(o) For "round toward plus infinity," the result is the same as if −OV were replaced by −HUGE . For all other rounding modes, the result is −OV.

(p) The result is a copy of the NaN operand, except that its sign is reversed if the other operand is negative and the five least significant bits $f_{lsb+4} \ldots f_{lsb}$ of the fraction field of the result are OR-ed with 01001 (to indicate overflow and inexact conditions).

(q) As computed in accordance with IEEE Std. 754, except that if overflow occurs or if the rounding mode is "round toward plus infinity" and the mathematical product is greater than +HUGE, the result is +OV. If underflow occurs and a computation in accordance with IEEE Std. 754 would result in the value +0 or if the rounding mode is "round toward minus infinity" and the mathematical product is less than +TINY, the result is +UN.

(r) For "round toward plus infinity," the result is the same as if −UN were replaced by −TINY. For all other rounding modes, the result is as computed in accordance with IEEE Std. 754.

(s) For "round toward minus infinity," the result is the same as if +UN were replaced by +TINY. For all other rounding modes, the result is as computed in accordance with IEEE Std. 754.

(t) As computed in accordance with IEEE Std. 754, except that if overflow occurs or if the rounding mode is "round toward minus infinity" and the mathematical product is less than −HUGE, the result is −OV. Additionally, if underflow occurs and a computation in accordance with IEEE Std. 754 would provide the result −0 or if the rounding mode is "round toward plus infinity" and the mathematical product is greater than −TINY, the result is −UN.

(u) The result is a copy of the NaN operand, except that its sign is reversed if the other operand is negative.

(v) For "round toward plus infinity," the result is the same as if +OV were replaced by +HUGE. For all other rounding modes, the result is −OV.

(w) For "round toward minus infinity," the result is the same as if −UN were replaced by −TINY. For all other rounding modes, the result is as computed in accordance with IEEE Std. 754.

(x) The result is a copy of the NaN operand, except that its sign is reversed if the other operand is negative, and the five least significant bits $f_{lsb+4} \ldots f_{lsb}$ of the fraction field of the result are OR-ed with 00101 (to indicate underflow and inexact conditions).

(y) For "round toward plus infinity," the result is the same as if +UN were replaced by +TINY. For all other rounding modes, the result is as computed in accordance with IEEE Std. 754.

(z) For "round toward minus infinity," the result is the same as if +OV were replaced by +HUGE. For all other rounding modes, the result is +OV.

(@) The result is a copy of the NaN operand that has the larger value in the fraction field, except that the five least significant bits $f_{lsb+4} \ldots f_{lsb}$ of the fraction field of the result are the bitwise OR of the five least significant bits $f_{lsb+4} \ldots f_{lsb}$ of the fraction field of the operands. Additionally, the sign bit of the result is 1, indicating a negative result, if and only if the sign bits of the two NaN operands differ.

It will be appreciated by one skilled in the art that, with the exemplary multiplier unit 42 operating according to the table depicted in FIG. 6, multiplication is commutative, even those cases where one or both operands are NaN values.

Divider Unit 43

As noted above, the exemplary divider unit 43 can perform two types of operations. A division operation is one in which the result Q=x/y, where "x" and "y" are operands. A remainder operation is one in which the result REM (x,y)=x−(y/n), where "n" is the integer nearest to the value x/y. An illustrative floating point divider circuit for use in performing division operations is described in U.S. patent application Ser. No.

10/035,647, filed Dec. 28, 2001, which assigned to the assignee of the present application and hereby incorporated by reference. An illustrative floating point remainder circuit for use in performing remainder operations is described in U.S. patent application Ser. No. 10/035,584, filed on Dec. 28, 2001, which is assigned to the assignee of the present application and hereby incorporated by reference.

Generally, results generated by the exemplary divider 43 in connection with division operations are described in the table depicted in FIG. 7 and results generated by the exemplary divider 43 in connection with remainder operations are described in the table depicted in FIG. 8. In one or both of those tables, the term "+P" or "+Q" means any finite positive representable value greater than "one," other than +OV. The term "−P" or "−Q" means any finite negative representable value less than negative-one, other than −OV. The term "+R" or "+S" means any positive non-zero value less than "one," other than +UN. The term "−R" or "−S" means any negative non-zero representable value greater than negative-one, other than −UN. Finally, the term "NaN" means any value whose exponent field is 11111111, other than one of the values represented by +∞ and −∞.

Furthermore, the following is a key to symbols in the table depicted in FIG. 7 (division operations):

(a) For "round toward plus infinity," the result is +∞ with the five least significant bits $f_{lsb+4} \ldots f_{lsb}$ of the fraction field being equal to the bitwise OR of the five least significant bits $f_{lsb+4} \ldots f_{lsb}$ of the fraction fields of the two operands. For "round toward minus infinity," the result is +0. For all other rounding modes, the result is a positive NaN value 0 11111111 10000000000000001001ouzx (to indicate "infinity divided by infinity" with the invalid operation flag set), where ouzx is the bitwise OR of the four least significant bits $f_{lsb+3} \ldots f_{lsb}$ of the fraction fields of the operands.

(b) The result is +∞, with the five least significant bits $f_{lsb+4} \ldots f_{lsb}$ of the fraction field of the result being equal to the bitwise OR of the five least significant bits $f_{lsb+4} \ldots f_{lsb}$ of the fraction field of the infinite operand with 01001 (to indicate overflow and inexact conditions).

(c) The result is +∞, with the five least significant bits $f_{lsb+4} \ldots f_{lsb}$ of the fraction field of the result being equal to the five least significant bits $f_{lsb+4} \ldots f_{lsb}$ of the fraction field of the infinite operand.

(d) The result is +∞, with the five least significant bits $f_{lsb+4} \ldots f_{lsb}$ of the fraction field of the result being the bitwise OR of the five least significant bits $f_{lsb+4} \ldots f_{lsb}$ of the fraction field of the infinite operand with 00101 (to indicate underflow and inexact conditions).

(e) The result is −∞, with the five least significant bits $f_{lsb+4} \ldots f_{lsb}$ of the fraction field of the result being equal to the five least significant bits $f_{lsb+4} \ldots f_{lsb}$ of the fraction field of tine infinite operand.

(f) The result is −∞, with the five least significant bits $f_{lsb+4} \ldots f_{lsb}$ of the fraction field of the result being the bitwise OR of the five least significant bits $f_{lsb+4} \ldots f_{lsb}$ of the fraction field of the infinite operand with 00101 (to indicate underflow and inexact conditions).

(g) The result is −∞, with five least significant bits $f_{lsb+4} \ldots f_{lsb}$ of the fraction field of the result being the bitwise OR of the five least significant bits $f_{lsb+4} \ldots f_{lsb}$ of the fraction field of the infinite operand with 01001 (to indicate overflow and inexact conditions).

(h) For "round toward plus infinity," the result is −0. For "round toward minus infinity," the result is −∞ with the five least significant bits $f_{lsb+4} \ldots f_{lsb}$ of the fraction field being equal to the bitwise OR of the five least significant bits $f_{lsb+4} \ldots f_{lsb}$ of the fraction fields of the two operands. For all other rounding modes, the result is a negative NaN value 1 11111111 10000000000000001001ouzx (to indicate "infinity divided by infinity" with the invalid operation flag set), where "ouzx" is the bitwise OR of the four least significant bits $f_{lsb+3} \ldots f_{lsb}$ of the fraction fields of the two operands.

(i) The result is a copy of the NaN operand, except that its sign is reversed if the other operand is negative, and the five least significant bits $f_{lsb+4} \ldots f_{lsb}$ of the fraction field of the result are the bitwise OR of the five least significant bits $f_{lsb+4} \ldots f_{lsb}$ of the fraction fields of the operands.

(j) For "round toward plus infinity," the result is +OV. For "round toward minus infinity," the result is +UN. For all other rounding modes, the result is the positive NaN value 0 11111111 10000000000000101111001 to indicate "OV divided by OV" with the invalid operation, overflow, and inexact flags set.

(k) For "round toward minus infinity," the result is the same as if −OV were replaced by −HUGE. For all other rounding modes, the result is +OV.

(l) The result is the +∞ value 0 11111111 00000000000000000001011 to indicate overflow, division by zero, and inexact.

(m) The result is the −∞ value 1 1111111 00000000000000000001011 to indicate overflow, division by zero, and inexact.

(n) For "round toward plus infinity," the result is the same as if −OV were replaced by −HUGE. For all other rounding modes, the result is −OV.

(o) For "round toward plus infinity," the result is −UN; for "round toward minus infinity," the result is −OV. For all other rounding modes, the result is the negative NaN value 1 11111111 10000000000000101111001 to indicate "OV divided by OV" with the invalid operation, overflow, and inexact flags set.

(p) The result is a copy of the NaN operand, except that its sign is reversed if the other operand is negative, and the five least significant bits $f_{lsb+4} \ldots f_{lsb}$ of the fraction field of the results are OR-ed with 01001 (to indicate overflow and inexact conditions).

(q) For "round toward plus infinity," the result is the same as if −OV were replaced by −HUGE, except that if underflow occurs and a computation in accordance with IEEE Std. 754 would have the result +0, the result is +UN. For all other rounding modes, the result is +UN.

(r) As computed in accordance with IEEE Std. 754, except that if overflow occurs or if the rounding mode is "round toward plus infinity" and the mathematical quotient is greater than +HUGE, the result is +OV. If underflow occurs and a computation in accordance with IEEE Std. 754 would provide the result +0, or if the rounding mode is "round toward minus infinity" and the mathematical quotient is less than +TINY, the result is +UN.

(s) The result is the +∞ value 0 11111111 00000000000000000000010 to indicate division by zero.

(t) The result is the −∞ value 1 11111111 00000000000000000000010 to indicate division by zero.

(u) As computed in accordance with IEEE Std. 754, except that if overflow occurs, or if the rounding mode is "round toward minus infinity" and the mathematical quotient is less than −HUGE, the result is −OV. If underflow occurs and a computation in accordance with IEEE Std. 754 would provide the result −0, or if the rounding mode is "round toward plus infinity" and the mathematical quotient is greater then −TINY, the result is −UN.

(v) For "round toward minus infinity," the result is the same as if +OV were replaced by +HUGE, except that if underflow occurs and a computation in accordance with IEEE Std. 754 would have result −0, the result is −UN. For all other rounding modes, the result is —UN.

(w) The result is a copy of the NaN operand, except that its sign is reversed if the other operand is negative.

(x) For "round toward minus infinity," the result is the same as if −UN were replaced by −TINY, except that if overflow occurs, the result is +OV. For all other rounding modes, the result is +OV.

(y) For "round toward plus infinity," the result is the same as if +UN were replaced by +TINY, except that if overflow occurs, the result is −OV. For all other rounding modes, the result is −OV.

(z) For "round toward plus infinity," the result is the same as if −UN were replaced by −TINY. For all other rounding modes, the result is +UN.

(1) For "round toward plus infinity," the result is +OV; for "round toward minus infinity," the result is +UN. For all other rounding modes, the result is the positive NaN value 0 11111111 10000000000000101010101 to indicate "UN divided by UN" with the invalid operation, underflow, and inexact flags set.

(2) The result is the +∞ value 0 11111111 00000000000000000000111 to indicate underflow, division by zero, and inexact conditions.

(3) The result is the value 1 11111111 00000000000000000000111 to indicate underflow, division by zero, and inexact conditions.

(4) For "rounding toward plus infinity," the result is −UN; for "round toward minus infinity," the result is −OV. For all other rounding modes, the result is the negative NaN value 1 11111111 10000000000000101010101 to indicate "UN divided by UN" with the invalid operation, underflow, and inexact flags set.

(5) For "round toward minus infinity," the result is the same as if −UN were replaced by −TINY. For all other rounding modes, the result is −UN.

(6) The result is a copy of the NaN operand, except that its sign is reversed if the other operand is negative, and the five least significant bits $f_{lsb+4} \ldots f_{lsb}$ of the fraction field of the result are OR-ed with 00101 to indicate underflow and inexact conditions.

(7) For "round toward plus infinity," the result is +∞ with the five least significant bits $f_{lsb+4} \ldots f_{lsb}$ of the fraction field all having the value zero; for "round toward minus infinity," the result is +0. For all other rounding modes, the result is the positive NaN value 0 11111111 10000000000000100010000 to indicate "zero divided by zero" with the invalid operation flag set.

(8) For "round toward plus infinity," the result is −0. For "round toward minus infinity," the result is −∞ with five least significant bits $f_{lsb+4} \ldots f_{lsb}$ of the fraction field all having the value zero. For all other rounding modes, the result is the negative NaN value 1 11111111 10000000000000100010000 to indicate "zero divided by zero" with the invalid operation flag set.

(9) For "round toward minus infinity," the result is the same as if +UN were replaced by +TINY. For all other rounding modes, the result is −UN.

(@) For "round toward plus infinity," the result is the same as if +UN were replaced by +TINY. For all other rounding modes, the result is +UN.

(#) For "round toward minus infinity," the result is the same as if −OV were replaced by −HUGE, except that if underflow occurs and a computation in accordance with IEEE Std. 754 would have the result value −0, the result is −UN. For all other rounding modes, the result is −UN.

($) For "round toward plus infinity," the result is the same as if −UN were replaced by −TINY, except that if overflow occurs, the result is −OV. For all other rounding modes, the result is −OV.

(%) For "round toward minus infinity," the result is the same as if +UN were replaced by +TINY, except that if overflow occurs, the result is +OV. For all other rounding modes, the result is +OV.

(^) For "round toward plus infinity," the result is the same as if +OV were replaced by +HUGE, except that if underflow occurs and a computation in accordance with IEEE Std. 754 would have the result +0, the result is +UN. For all other rounding modes, the result is +UN.

(&) For "round toward plus infinity," the result is the same as if +OV were replaced by +HUGE. For all other rounding modes, the result is −OV.

(*) For "round toward minus infinity," the result is the same as if +OV were replaced by +HUGE; for all other rounding modes, the result is +OV.

(~) The result is a copy of the NaN operand that has the larger value in its fraction field, except that the five least significant bits $f_{lsb+4} \ldots f_{lsb}$ of the fraction field of the result are the bitwise OR of the five least significant bits $f_{lsb+4} \ldots f_{lsb}$ of the fraction fields of the operands. Additionally, the sign bit of the result is 1 if and only if the sign bits of the two NaN operands differ.

Preliminarily, remainder operations are not affected by the rounding mode. The following is a key to symbols in the table depicted in FIG. 8 (remainder operations) as follows:

(a) The result is a NaN value s 11111111 10000000000000101001ouzx (to indicate "remainder of infinity" with the invalid operation flag set), where "ouzx" is the bitwise OR of the four least significant bits $f_{lsb+4} \ldots f_{lsb}$ of the fraction fields of the operand. The sign of the result is the same as the sign of the first operand.

(b) The result is a NaN value s 11111111 10000000000000101111nouzx (to indicate "remainder of infinity by OV"), where "nouzx" is the bitwise OR of the five least significant bits $f_{lsb+4} \ldots f_{lsb}$ of the fraction field of the infinite operand with 11001 (to indicate invalid operation, overflow, and inexact conditions). The sign of the result is the same as the sign of the first operand.

(c) The result is a NaN value s 11111111 10000000000000101001ouzx (to indicate "remainder of infinity" with the invalid operation flag set), where "ouzx" is the low four bits of the infinite operand. The sign of the result is the same as the sign of the first operand.

(d) The result is a NaN value s 11111111 10000000000000101110nouzx (to indicate "remainder of infinity by UN"), where "nouzx" is the bitwise OR of the five least significant bits $f_{lsb+4} \ldots f_{lsb}$ of the fraction field of the infinite operand with 10101 (to indicate invalid operation, underflow, and inexact conditions). The sign of the result is the same as the sign of the first operand.

(e) The result is a NaN value s 11111111 10000000000000101011ouzx (to indicate "remainder of infinity by zero" with the invalid operation flag set), where "ouzx" is the four least significant bits $f_{lsb+3} \ldots f_{lsb}$ of the fraction field of the infinite operand. The sign of the result is the same as the sign of the first operand.

(f) The result is a copy of the NaN operand, except that the sign of the result is the same as the sign of the first operand, and the five least significant bits $f_{lsb+4} \ldots f_{lsb}$ of the fraction field of the result are the bitwise OR of the five least significant bits $f_{lsb+4} \ldots f_{lsb}$ of the fraction fields of the two operands.

(g) The result is a copy of the first operand (either –OV or +OV). One might expect the result to be a NaN value s 11111111 10000000000011000nouzx (to indicate "remainder of OV"), where "nouzx" is the bitwise OR of the five least significant bits $f_{lsb+4} \ldots f_{lsb}$ of the fraction field of the infinite operand with 11001 (to indicate invalid operation, overflow, and inexact), and where the sign of the result is the same as the sign of the first operand. However, the actual result is preferably a copy of the first operand, in order to preserve an important numerical identity, which is that REM(x, +Inf)=REM(x, –Inf)=x.

(h) The result is a NaN value s 11111111 10000000000001101111001 (to indicate "remainder of OV by OV" with the invalid operation, overflow, and inexact flags set). The sign of the result is the same as the sign of the first operand.

(i) The result is a NaN value s 11111111 10000000000001100011001 (to indicate "remainder of OV" with the invalid operation, overflow, and inexact flags set). The sign of the result is the same as the sign of the first operand.

(j) The result is a NaN value s 11111111 10000000000001101011101 (to indicate "remainder of OV by UN" with the invalid operation, overflow, underflow, and inexact flags set). The sign of the result is the same as the sign of the first operand.

(k) The result is a NaN value s 11111111 10000000000001100111001 (to indicate "remainder of OV by zero" with the invalid operation, overflow, and inexact flags set). The sign of the result is the same as the sign of the first operand.

(l) The result is a copy of the NaN operand, except that the sign of the result is the same as the sign of the first operand, and the five least significant bits $f_{lsb+4} \ldots f_{lsb}$ of the fraction field of the result are OR-ed with 01001 (to indicate overflow and inexact conditions).

(m) The result is a NaN value s 11111111 10000000000001001111001 (to indicate "remainder by OV" with the invalid operation, overflow, and inexact flags set). The sign of the result is the same as the sign of the first operand.

(n) The result is calculated in accordance with IEEE Std. 754. In this case, the sign of the result is not necessarily the same as the sign of the first operand.

(o) The result is a NaN value s 11111111 10000000000001001010101 (to indicate "remainder by UN" with the invalid operation, underflow, and inexact flags set). The sign of the result is the same as the sign of the first operand.

(p) The result is a NaN value s 11111111 10000000000001000110000 (to indicate "remainder by zero" with the invalid operation flag set). The sign of the result is the same as the sign of the first operand.

(q) The result is a copy of the NaN operand, except that the sign of the result is the same as the sign of the first operand.

(r) The result is a NaN value s 11111111 10000000000001001111011 (to indicate "remainder by OV" with the invalid operation, overflow, underflow, and inexact flags set). The sign of the result is the same as the sign of the first operand.

(s) The result is a NaN value s 11111111 10000000000001000110101 (to indicate "remainder by zero" with the invalid operation, underflow, and inexact flags set). The sign of the result is the same as the sign of the first operand.

(t) The result is a copy of the NaN operand, except that the sign of the result is the same as the sign of the first operand, and the low five bits of the result are OR-ed with 00101 (to indicate underflow and inexact conditions).

(u) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction fields of the operands.

(v) The result is a copy of the NaN operand, except that the five least significant bits $f_{lsb+4} \ldots f_{lsb}$ of the fraction field of the result are OR-ed with 01001 (to indicate overflow and inexact conditions).

(w) The result is a copy of the NaN operand.

(x) The result is a copy of the NaN operand, except that the five least significant bits $f_{lsb+4} \ldots f_{lsb}$ of the fraction field of the result are OR-ed with 00101 (to indicate underflow and inexact conditions).

(y) The result is a copy of the NAN operand whose fraction field represents the larger value, except that the five least significant bits $f_{lsb+4} \ldots f_{lsb}$ of the fraction field of the result are the bitwise OR of the low five bits of each operand and the sign of the result is the same as the sign of the first operand.

Square Root Unit 44

An illustrative circuit for use as exemplary square root unit 44 is described in U.S. patent application Ser. No. 10/035,579, filed on Dec. 28, 2001, which is assigned to the assignee of the present application and hereby incorporated by reference. Results generated by the exemplary square root unit are described in the table depicted in FIG. 9. In the table of FIG. 9, the term "+P" means any finite positive nonzero representable value other than +UN and +OV. The term "–P" means any finite negative nonzero representable value other than –UN and –OV. Finally, the term "NaN" means any value whose exponent field is 11111111, other than one of the values represented by +∞ AND –∞.

Maximum/Minimum Unit 45

An illustrative circuit for use as exemplary maximum/minimum unit 45 is described in U.S. patent application Ser. No. 10/035,746, filed on Dec. 28, 2001, which is assigned to the assignee of the present application and hereby incorporated by reference. Generally, results generated by the exemplary maximum/minimum unit 45 in connection with a maximum operation, in which the unit 45 determines the maximum of two operands, are described in the table depicted in FIG. 10. Results generated in connection with a minimum operation, in which the unit 45 determines the minimum of two operands, are described in the table depicted in FIG. 11. In those tables, "+P" or "+Q" means any finite positive nonzero representable value other than +UN and +OV. Additionally, "–P" or "–Q" means any finite negative nonzero representable value other than –UN and –OV. Further, "NaN" means any value whose exponent field is 1111111, other than one of the values represented by +∞ and –∞.

In an embodiment of the present invention, neither the maximum operation nor the minimum operation is affected by the rounding mode. In addition, both the maximum operation and the minimum operation are commutative, even when one or both operands are NaN value.

The following is a key to symbols in the table depicted in FIG. 10 (the maximum operation):
(a) The result is −∞ with the five least significant bits $f_{lsb+4} \ldots f_{lsb}$ of the fraction field of the result being the bitwise OR of the five least significant bits $f_{lsb+4} \ldots f_{lsb}$ of the fraction field of the two operands.
(b) The result is +∞ with the five least significant bits $f_{lsb+4} \ldots f_{lsb}$ of the fraction field of the result being the five least significant bits $f_{lsb+4} \ldots f_{lsb}$ of the fraction field of the +∞ operand. The other operand does not affect the five least significant bits $f_{lsb+4} \ldots f_{lsb}$ of the fraction field of the result.
(c) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction field of the two operands.
(d) The result is a copy of the Nan operand, except that the five least significant bits $f_{lsb+4} \ldots f_{lsb}$ of the fraction field of the result are the bitwise OR of the five least significant bits $f_{lsb+4} \ldots f_{lsb}$ of the fraction field of the NaN operand with 01001 (to indicate overflow and inexact conditions).
(e) The result is a copy of whichever operand has the smaller magnitude.
(f) The result is a copy of the Nan operand.
(g) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction field of the NaN operand with 00101 (to indicate underflow and inexact conditions).
(h) The result is a copy of whichever operand has the larger magnitude.
(i) The result is +∞ with the five least significant bits $f_{lsb+4} \ldots f_{lsb}$ of the fraction field of the result being the bitwise OR of the five least significant bits $f_{lsb+4} \ldots f_{lsb}$ of the fraction fields of the two operands.
(j) The result is a copy of whichever NaN operand has the larger fraction, except that the five least significant bits $f_{lsb+4} \ldots f_{lsb}$ of the fraction field of the result are the bitwise OR of the five least significant bits $f_{lsb+4} \ldots f_{lsb}$ of the fraction field of the two operands. The sign of the result is the sign of whichever operand has the larger fraction but, if the fractions of the two NaN operands are the same and their signs differ, the sign of the result is +.

The following is a key to symbols in the table depicted in FIG. 11 (the minimum operation):
(a) The result is −∞ with the five least significant bits $f_{lsb+4} \ldots f_{lsb}$ of the fraction field bits of the result being the bitwise OR of the five least significant bits $f_{lsb+4} \ldots f_{lsb}$ of the fraction fields of the two operands.
(b) The result is −∞ with the five least significant bits $f_{lsb+4} \ldots f_{lsb}$ of the fraction field of the result being equal to the five least significant bits $f_{lsb+4} \ldots f_{lsb}$ of the fraction field of the operand. The other operand does not affect the five least significant bits $f_{lsb+4} \ldots f_{lsb}$ of the fraction field of the result.
(c) The result is a copy of the −∞ NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction fields of the two operands.
(d) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction field of the NaN operand with 01001 (to indicate overflow and inexact conditions).
(e) The result is a copy of whichever operand has the larger magnitude.
(f) The result is a copy of the NaN operand.
(g) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction field of the NaN operand with 00101 (to indicate underflow and inexact conditions).
(h) The result is a copy of whichever operand has the smaller magnitude.
(i) The result is +∞ with the five least significant bits $f_{lsb+4} \ldots f_{lsb}$ of the fraction field of the result being the bitwise OR of the five least significant bits $f_{lsb+4} \ldots f_{lsb}$ of the fraction field of the two operands.
(j) The result is a copy of whichever NaN operand has the larger (not smaller) fraction, except that the five least significant bits $f_{lsb+4} \ldots f_{lsb}$ of the fraction field of the result are the bitwise OR of the five least significant bits $f_{lsb+4} \ldots f_{lsb}$ of the fraction field of the two operands. The sign of the result is the sign of whichever operand has the larger fraction. However, if the fractions of the two NaN operands are the same and their signs differ, the sign of the result is −.

Comparator Unit 46

An illustrative circuit for use as exemplary comparator unit 46 is described in U.S. patent application Ser. No. 10/035, 586, filed on even date herewith in the name of Guy L. Steel Jr., and entitled "Floating Point Comparator Circuit and Method," assigned to the assignee of the present application and hereby incorporated by reference. As noted above, exemplary comparator unit 46 receives two operands and generates a result that indicates whether the operands are equal, and, if not, which operand is larger. Generally, the comparison is not affected by the rounding mode. In a comparison operation consistent with an embodiment of the present invention, two positive operands in the infinity format 65 are equal regardless of the values of the flags "nouzx,"

a positive operand in the infinity format 65 is greater than an operand in any other format, except for an operand that is in the NaN format 66, two negative operands in the infinity format 65 are equal regardless of the values of the flags "nouzx,"

a negative operand in the infinity format 65 is less than an operand in any other format, except for an operand that is in the NaN format 66.

an operand in the NaN format 66 is unordered (i.e., neither greater than, less than, nor equal to) another operand in any format, including another operand in the NaN format 66, and operands in the format other than the infinity format 65 and NaN format 66 compare in accordance with IEEE Std. 754. Thus, +UN is greater than +0 and less than +TINY; +OV is greater than +HUGE and less than +∞; and so on.

An illustrative circuit for use as exemplary tester unit 47 is described in U.S. patent application Ser. No. 10/035,741, filed on even date herewith in the name of Guy L. Steele Jr., and entitled "Floating Point Tester Circuit And Method," assigned to the assignee of the present application and hereby incorporated by reference. The tester unit 47 receives a single floating-point operand and determines whether it has one of a selected set of status conditions. Based upon the determination, the tester unit 47 produces a signal to indicate whether or not the selected condition holds. In one embodiment of the present invention, the conditions include:

the operand is in the NaN format 66;
the operand is in the infinity format 65;
the operand is in either the infinity format 65 or the NaN format 66;
the operand is in the overflow format 64;
the operand is in the overflow format 64 or contains a set overflow flag "o";
the operand is in the underflow format 61;
the operand is in the underflow format 61 or contains a set underflow flag "u";
the operand is in the zero format 60;
the operand is in the zero format 60 and the siqn bit "s" is "zero" (representing value +0);
the operand is in the zero format 60 and the sign bit "s" is "one" (representing value −0);
the operand represents a non-zero number whose magnitude is less than $2^{-126}$;
the operand contains a set invalid-operation flag "n";
the operand contains a set dividebyzero flag "z";
the operand represents a numerical value strictly between −OV and +OV;
the operand represents a numerical value strictly between −OV and +OV but is not +UN or −UN;
the operand is in any format 60 through 66 and contains a sign bit "s" that is "one"; and
all 11 non-trivial disjunctions ("OR") of subsets of:
a=(the operand is in overflow format 64 or contains a set overflow flag "o")
b=(the operand is in underflow format 61 or contains a set underflow flag "u")
c=(the operand contains a set invalid operation flag "n")
d=(the operand contains a set divide-by-zero flag "z")

In other words, the subsets include (a OR b), (a OR c), (a OR d), (b OR c), (b OR d), (c OR d), (a OR b OR c), (a OR b OR d), (a OR c OR d), (b OR c OR d) and (a OR b OR c OR d).

The exemplary tester unit 47 can generate one or more result signals representing each of those conditions, which signals will be provided to the control unit 50. In one embodiment, the result signal is provided directly back to control unit 50. In an alternative embodiment, the tester unit 47 provides the result signal on a result bus to register 51 for future access by the control unit 50. In another embodiment, the control unit 50 can select one of these signals and use the value of the selected signal to control the future behavior of the program. For example, the control unit 50 may control a functional unit's operation on one or more operands and use the result of the operation to complete processing of a conditional floating point operation. Examples of conditional floating point operations include but are not limited to conditional trap instructions and conditional branch instructions with multiple possible outcomes that dynamically depend upon the basis of the results of the conditional operations being processed.

It will be appreciated that a number of modifications may be made to the exemplary floating point unit 40 described above. For example, the exemplary floating point unit 40 may include additional or fewer functional units than those described herein. In addition, although reference has been made to circuits described in other patent applications as being useful in the floating point unit 40, it will be appreciated that other circuits may be used to implement the principles of the present invention. Furthermore, although particular floating point status flags "n," "o," "u," "z" and "x" have been indicated as being provided, it will be appreciated that not all flags need to be provided, and that other flags, representing other conditions, may be used in addition or instead.

The foregoing description has been limited to one or more specific embodiments of this invention. It will be appreciated that a system in accordance with the invention can be constructed in whole or in part from special purpose hardware or a general purpose computer system, or any combination thereof. Data structures used by such a system and described herein are illustrative and may be implemented in a variety of different ways in accordance with alternative embodiments of the present invention. Any portion of the system may also be controlled by a suitable program. Any program controlling such a system may, in whole or in part, comprise part of or be stored on the system in a conventional manner. Further, the program may, in whole or in part, be provided to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

Furthermore, those skilled in the art will appreciate that variations and modifications may be made to the invention, with the attainment of some or all of the advantages of the invention.

Other embodiments of the invention will be apparent to those skilled in the art from consideration of the specification and practice of the invention as defined solely by the following appended claims. Therefore, a true scope and spirit of the invention is indicated by the following claims.

What is claimed is:

1. A memory for storing data for access by a processing device, comprising:
a floating point operand data structure used in floating point computations and processing within the processing device, the data structure comprising:
a first portion of the data structure having floating point operand data; and
a second portion of the data structure having embedded status information associated with at least one status condition of the floating point operand data.

2. The memory of claim 1, wherein the at least one status condition is determined from the embedded status information without regard to memory storage external to the data structure.

3. The memory of claim 2, wherein the memory storage external to the data structure is a floating point status register.

4. The memory of claim 3, wherein the outcome of a conditional floating point instruction is based on the embedded status information without regard to contents of the floating point status register.

5. The memory of claim 1, wherein the second portion of the data structure comprises at least one bit that is indicative of the at least one status condition from the group of an invalid operation status, an overflow status, an underflow status, a division by zero status, an infinity status, and an inexact status.

6. The memory of claim 5, wherein the overflow status represents one in a group of a +OV status and a −OV status.

7. The memory of claim 6, wherein the overflow status is represented as a predetermined non-infinity numerical value.

8. The memory of claim 5, wherein the underflow status represents one in a group of a +UV status and a −UV status.

9. The memory of claim 5, wherein the underflow status is represented as a predetermined non-zero numerical value.

10. The memory of claim 5, wherein the invalid status represents a not-a-number (NaN) status due to an invalid operation.

11. The memory of claim 10, wherein the second portion of the data structure comprises a plurality of bits indicative of a predetermined type of operand condition resulting in the NaN status.

12. The memory of claim 10, wherein addition, multiplication, maximum and minimum floating point operations on the data structure are commutative.

13. The memory of claim 5, wherein the infinity status represents one in a group of a positive infinity status and a negative infinity status.

14. The memory of claim 1, wherein the second portion of the data structure comprises a plurality of bits indicative of a predetermined type of operand condition resulting in the infinity status.

15. The memory of claim 1, wherein the at least one status condition is associated with at least one floating point operation that generated the enhanced floating point operand data structure.

16. A device for storing data for access by a processor, comprising:
    a floating point operand data structure used by the processing device when performing floating point operations, the data structure comprising:
        a first data field having sign information associated with the floating point operand;
        a second data field having exponent information associated with the floating point operand; and
        a third data field having fractional information associated with the floating point operand, wherein at least one of the first data field, the second data field and the third data field further includes embedded status information associated with at least one operand status condition.

17. The device of claim 16, wherein the at least one operand status condition is determined from the embedded status information without regard to a floating point status register that is separate from an operand memory storage device for maintaining the floating point operand data structure.

18. The device of claim 17, wherein the outcome of a conditional floating point instruction is based on the embedded status information without regard to contents of the floating point status register.

19. The device of claim 16, wherein the embedded status information comprises at least one bit that is indicative of the at least one operand status condition from the group of an invalid operation status, an overflow status, an underflow status, a division by zero status, an infinity status, and an inexact status.

20. The device of claim 16, wherein the at least one operand status condition is indicative of at least one floating point operation that generated the floating point operand data structure.

21. A floating point system associated with a processing device for performing at least one floating point operation on a floating point operand, the system comprising:
    an operand memory storage device for maintaining the floating point operand;
    a control unit in communication with the operand memory storage device, the control unit receiving at least one floating point instruction associated with the at least one floating point operation and generating at least one control signal related to the at least one floating point operation; and
    a first functional processing unit in communication with the operand memory storage device and the control unit, the first functional processing unit processing the floating point operand and storing status information within the processed floating point operand.

22. The floating point system of claim 21, wherein the status information comprises at least one bit that is indicative of an operand status condition from the group of an invalid operation status, an overflow status, an underflow status, a division by zero status, an infinity status, and an inexact status.

23. The floating point system of claim 21, wherein the first functional processing unit is capable of embedding the status information related to the processed floating point operand within predetermined fields of the processed floating point operand.

24. The floating point system of claim 21, wherein the first functional processing unit is capable of providing the processed floating point operand to the operand memory storage device without storing the status information to a separate status memory device.

25. The floating point system of claim 24, wherein the control unit is operative to condition the outcome of the floating point instruction based upon the status information within the processed floating point operand without accessing the separate status memory device.

26. The floating point system of claim 21 further comprising a second functional processing unit in communication with the memory storage device and the control unit, the second functional processing unit being capable of processing a second floating point operand and storing status information related to the second floating point operand while the status information related to the first floating point operand is preserved.

27. A floating point processing system for performing at least one floating point operation on a floating point operand, the system comprising:
    an operand memory register for maintaining the floating point operand; and
    a functional processing unit in communication with the operand memory register, the functional processing unit being operative to:
        receive the floating point operand from the operand memory register,
        process the floating point operand to determine status information related to the processed floating point operand, and
        embed the status information within a second portion of the processed floating point operand, the second portion being distinct from a first portion of the floating point operand containing a value.

28. The floating point system of claim 27, wherein the status information comprises at least one bit that is indicative of an operand status condition from the group of an invalid operation status, an overflow status, an underflow status, a division by zero status, an infinity status, and an inexact status.

29. The floating point system of claim 27, wherein the functional processing unit is further operable to embed the status information within at least one predetermined field of the processed floating point operand.

30. The floating point system of claim 27, wherein the functional processing unit is capable of storing the processed floating point operand in the operand memory register without storing the status information in a floating point status register separate from the operand memory register.

31. The floating point system of claim 27 further comprising a control unit in communication with the operand memory register and the functional processing unit, the control unit being operative to condition the outcome of a floating point instruction based only upon the status information within the processed floating point operand.

32. The floating point system of claim 31 further comprising an additional functional processing unit in communication with the operand memory register and the control unit, the additional functional processing unit being capable of concurrently processing an additional floating point operand and storing status information related to the additional floating point operand within the additional floating point operand while the status information related to the other floating point operand is preserved within the other floating point operand.

33. A method of encoding a floating point operand with status information without maintaining the status information in a floating point status register, comprising:
   determining a status condition of the floating point operand as part of processing the floating point operand in association with a floating point operation; and
   representing an updated status condition of the floating point operand within a second portion of the floating point operand, the second portion being distinct from a first portion of the floating point operand containing a value.

34. The method of claim 33, wherein the determining step further comprises identifying the status condition and the updated status condition from only embedded status information within the floating point operand.

35. The method of claim 33, wherein the status condition and the updated status condition are from the group of an invalid operation status, an overflow status, an underflow status, a division by zero status, an infinity status, and an inexact status.

36. The method of claim 33, wherein the representing step further comprises embedding updated status information within the floating point operand after execution of the floating point operation, the updated status information representing the updated status condition.

37. The method of claim 33, wherein the updated status condition is indicative of a previous floating point operation that resulted in the floating point operand.

38. The method of claim 33 further comprising conditioning a subsequent floating point operation based only upon the updated status information within the floating point operand.

39. The method of claim 33 further comprising processing an additional floating point operand and representing updated status information related to the additional floating point operand within the additional floating point operand while the updated status information related to the other floating point operand is preserved.

40. A method of encoding a floating point operand with status information related to a status of the floating point operand without maintaining the status information in a floating point status register, comprising:
   receiving a floating point instruction;
   accessing a floating point operand to be processed as part of processing the floating point instruction;
   decoding an initial status condition of the floating point operand from only status information embedded within the floating point operand; and
   encoding a resulting status condition from execution of the floating point instruction on the floating point operand as updated status information within the floating point operand.

41. The method of claim 40 further comprising conditioning execution of a subsequent floating point instruction based only on the updated status information within the floating point operand.

42. The method of claim 40, wherein the initial status condition and resulting status condition are from the group of an invalid operation status, an overflow status, an underflow status, a division by zero status, an infinity status, and an inexact status.

43. The method of claim 40 further comprising processing an additional floating point operand and encoding an updated status information into the additional floating point operand while the updated status information related to the other floating point operand is preserved.

44. A computer-readable medium on which is stored a set of instructions for encoding a floating point operand with status information without maintaining the status information in a floating point status register, which when executed perform steps comprising:
   determining a status condition of the floating point operand as part of processing the floating point operand in association with a floating point operation; and
   representing an updated status condition of the floating point operand within a second portion of the floating point operand, the second portion being distinct from a first portion of the floating point operand containing a value.

45. The computer-readable medium of claim 44, wherein the determining step further comprises identifying the status condition and the updated status condition from only embedded status information within the floating point operand.

46. The computer-readable medium of claim 44, wherein the status condition and the updated status condition are from the group of an invalid operation status, an overflow status, an underflow status, a division by zero status, an infinity status, and an inexact status.

47. The computer-readable medium of claim 44, wherein the representing step further comprises embedding updated status information within the floating point operand after execution of the floating point operation, the updated status information representing the updated status condition.

48. The computer-readable medium of claim 44, wherein the updated status condition is indicative of a previous floating point operation that resulted in the floating point operand.

49. The computer-readable medium of claim 44 further comprising conditioning a subsequent floating point operation based only upon the updated status information within the floating point operand.

50. The computer-readable medium of claim 44 further comprising processing an additional floating point operand and representing updated status information related to the additional floating point operand within the additional floating point operand while the updated status information related to the other floating point operand is preserved.

51. A computer-readable medium on which is stored a set of instructions for encoding a floating point operand with status information related to a status of the floating point operand without maintaining the status information in a floating point status register, which when executed perform steps comprising:
   receiving a floating point instruction;
   accessing a floating point operand to be processed as part of processing the floating point instruction;

decoding an initial status condition of the floating point operand from only status information embedded within the floating point operand; and encoding a resulting status condition from execution of the floating point instruction on the floating point operand as updated status information within the floating point operand.

52. The computer-readable medium of claim 51 further comprising conditioning execution of a subsequent floating point instruction based only on the updated status information within the floating point operand.

53. The computer-readable medium of claim 51, wherein the initial status condition and resulting status condition are from the group of an invalid operation status, an overflow status, an underflow status, a division by zero status, an infinity status, and an inexact status.

54. The computer-readable medium of claim 51 further comprising processing an additional floating point operand and encoding an updated status information into the additional floating point operand while the updated status information related to the other floating point operand is preserved.

* * * * *